United States Patent
Ko et al.

(10) Patent No.: US 8,982,848 B2
(45) Date of Patent: Mar. 17, 2015

(54) METHOD AND APPARATUS FOR TRANSMITTING DOWNLINK REFERENCE SIGNAL

(75) Inventors: Hyun Soo Ko, Anyang-si (KR); Jae Hoon Chung, Anyang-si (KR); Bin Chul Ihm, Anyang-si (KR); Moon Il Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 218 days.

(21) Appl. No.: 13/384,219

(22) PCT Filed: Jul. 19, 2010

(86) PCT No.: PCT/KR2010/004713
§ 371 (c)(1),
(2), (4) Date: Jan. 13, 2012

(87) PCT Pub. No.: WO2011/008062
PCT Pub. Date: Jan. 20, 2011

(65) Prior Publication Data
US 2012/0113795 A1 May 10, 2012

Related U.S. Application Data

(60) Provisional application No. 61/236,894, filed on Aug. 26, 2009, provisional application No. 61/226,296, filed on Jul. 17, 2009.

(30) Foreign Application Priority Data

Jul. 14, 2010 (KR) .................. 10-2010-0067856

(51) Int. Cl.
*H04W 4/00* (2009.01)
*H04J 13/00* (2011.01)
(Continued)

(52) U.S. Cl.
CPC ............. *H04J 13/004* (2013.01); *H04L 5/0051* (2013.01); *H04L 27/2613* (2013.01); *H04L 5/0016* (2013.01); *H04L 5/0023* (2013.01); *H04L 5/0026* (2013.01)
USPC ........... 370/334; 370/319; 370/320; 370/321; 370/337

(58) Field of Classification Search
None
See application file for complete search history.

(56) References Cited

U.S. PATENT DOCUMENTS 8,218,663 B2 * 7/2012 Muharemovic et al. ...... 375/260
8,761,087 B2 * 6/2014 Nam et al. .................... 370/328
(Continued)

FOREIGN PATENT DOCUMENTS

CN 1387708 12/2002
CN 101179538 5/2008
(Continued)

OTHER PUBLICATIONS

Fujitsu, "DL Reference Signal Design for 8×8 MIMO in LTE-Advanced," 3GPP TSG-RAN1 #56, R1-090706, Feb. 2009, 12 pages.*
(Continued)

*Primary Examiner* — Ayaz Sheikh
*Assistant Examiner* — Faiyazkhan Ghafoerkhan
(74) *Attorney, Agent, or Firm* — Lee, Hong, Degerman, Kang & Waimey

(57) ABSTRACT

The present invention relates to transmitting a downlink reference signal in a wireless communication system. A method for a base station to transmit a downlink signal by using two or more layers includes multiplexing and transmitting a reference signal for the two or more layers on the basis of a reference signal pattern on a data region of a downlink subframe and transmitting data for the two or more layers on the data region of the downlink subframe, wherein the reference signal for the two or more layers is a dedicated reference signal that is used to demodulate the data for the two or more layers on a receiving end, and in the multiplexing of the reference signal, the reference signal for the two or more layers is code-division-multiplexed by an orthogonal code having a length of at least 2.

17 Claims, 31 Drawing Sheets

(51) Int. Cl.
*H04L 5/00* (2006.01)
*H04L 27/26* (2006.01)

(56) References Cited

U.S. PATENT DOCUMENTS

| | | | |
|---|---|---|---|
| 2004/0001429 A1* | 1/2004 | Ma et al. | 370/210 |
| 2006/0007850 A1* | 1/2006 | Park et al. | 370/209 |
| 2009/0067522 A1* | 3/2009 | Kwak et al. | 375/260 |
| 2009/0110114 A1* | 4/2009 | Onggosanusi et al. | 375/299 |
| 2010/0034312 A1* | 2/2010 | Muharemovic et al. | 375/267 |
| 2010/0046412 A1* | 2/2010 | Varadarajan et al. | 370/312 |
| 2010/0046494 A1* | 2/2010 | Palanki et al. | 370/344 |
| 2010/0056197 A1* | 3/2010 | Attar et al. | 455/522 |
| 2010/0061360 A1* | 3/2010 | Chen et al. | 370/342 |
| 2010/0062783 A1* | 3/2010 | Luo et al. | 455/450 |
| 2010/0238877 A1* | 9/2010 | Nam et al. | 370/329 |
| 2010/0273506 A1* | 10/2010 | Stern-Berkowitz et al. | 455/456.1 |
| 2010/0322179 A1* | 12/2010 | Yu et al. | 370/329 |
| 2011/0235730 A1* | 9/2011 | Noh et al. | 375/260 |
| 2011/0299449 A1* | 12/2011 | Kwon et al. | 370/312 |
| 2012/0120905 A1* | 5/2012 | Ko et al. | 370/329 |

FOREIGN PATENT DOCUMENTS

| | | |
|---|---|---|
| CN | 101375570 | 2/2009 |
| WO | 2008/072899 | 6/2008 |

OTHER PUBLICATIONS

CMCC, "Discussions on DM-RS Design with Rank Grouping," 3GPP TSG RAN WG1 Meeting #57bis, R1-092823, Jun. 2009, 4 pages.*

Fujitsu, "DL Reference Signal Design for 8×8 MIMO in LTE-Advanced," 3GPP TSG-RAN1 #56, R1-090706, 12 pages.

Nokia, et al., "Further considerations on UE-specific reference symbol multiplexing for LTE-Advanced downlink," 3GPP TSG RAN WG1 Meeting #57, R1-091757, 8 pages.

CMCC, "Discussions on DM-RS Design with Rank Grouping," 3GPP TSG RAN WG1 Meeting #57bis, R1-092823, Jun. 2009, 4 pages.

European Patent Office Application Serial No. 10800073.8, Search Report dated Jun. 25, 2014, 9 pages.

* cited by examiner

FIG. 5

|   | 0 | 1 | 2 | 3 | 4 | 5 | 6 | 0 | 1 | 2 | 3 | 4 | 5 | 6 |
|---|---|---|---|---|---|---|---|---|---|---|---|---|---|---|
| 0 |   |   |   |   |   |   |   |   |   |   |   |   |   |   |
| 1 |   |   |   |   |   |   | R5 |   |   |   |   |   | R5 |   |
| 2 | R1 | R3 |   |   | R0 |   |   | R1 | R2 |   |   | R0 |   |   |
| 3 |   |   |   | R5 |   |   |   |   |   |   | R5 |   |   |   |
| 4 |   |   |   |   |   |   |   |   |   |   |   |   |   |   |
| 5 | R0 | R2 |   |   | R1 |   | R5 | R0 | R3 |   |   | R1 | R5 |   |
| 6 |   |   |   |   |   |   |   |   |   |   |   |   |   |   |
| 7 |   |   |   | R5 |   |   |   |   |   |   | R5 |   |   |   |
| 8 | R1 | R3 |   |   | R0 |   |   | R1 | R2 |   |   | R0 |   |   |
| 9 |   |   |   |   |   | R5 |   |   |   |   |   |   | R5 |   |
| 10 |   |   |   |   |   |   |   |   |   |   |   |   |   |   |
| 11 | R0 | R2 |   | R5 | R1 |   |   | R0 | R3 | R5 |   | R1 |   |   |

FIG. 7
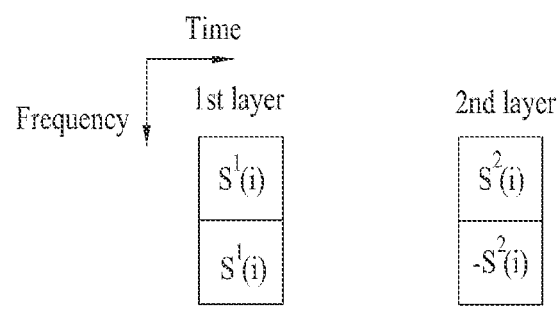
(a)
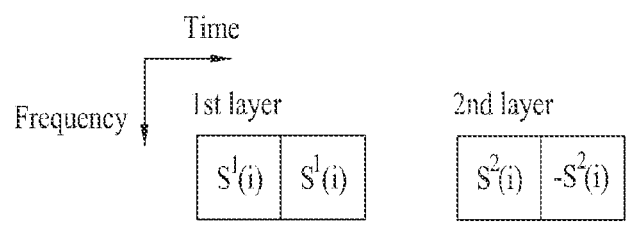
(b)

FIG. 8
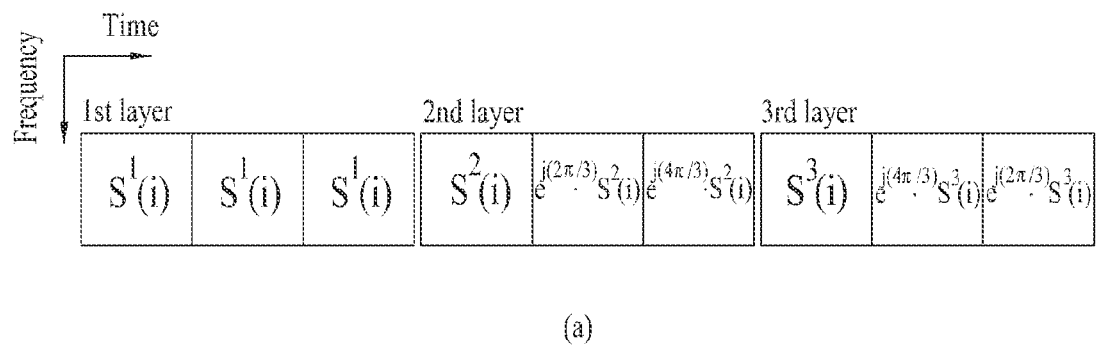
(a)
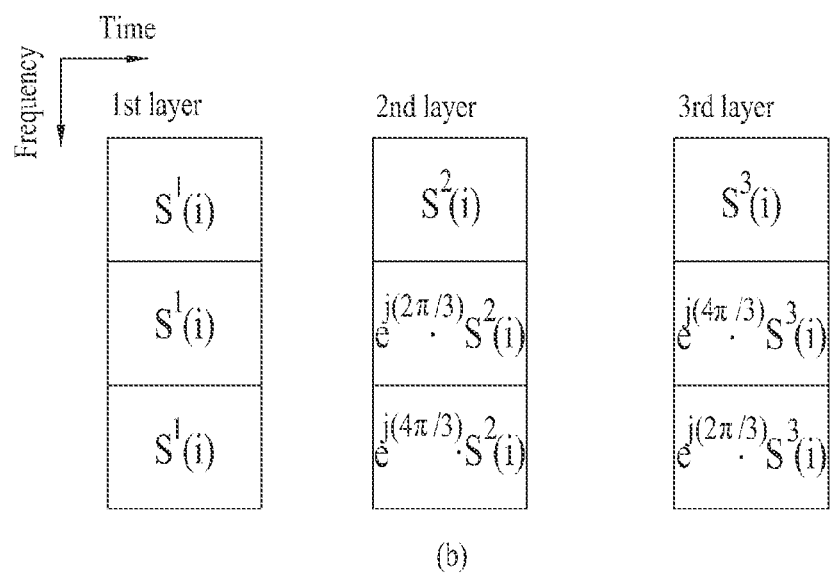
(b)

FIG. 14
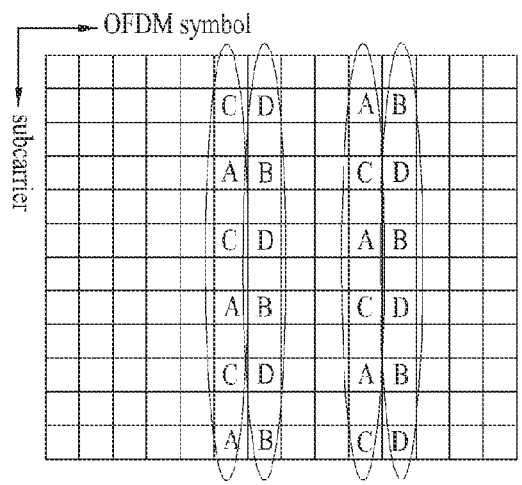
(a)
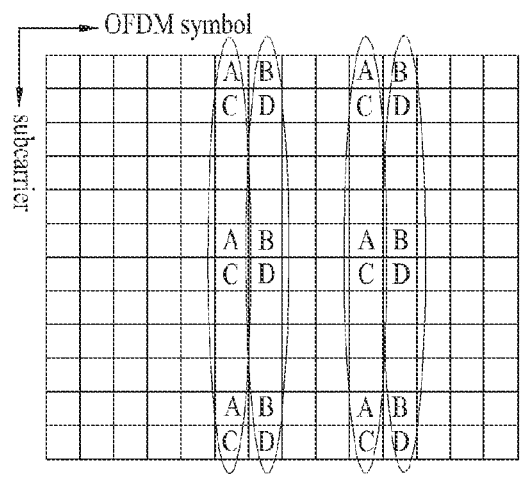
(b)
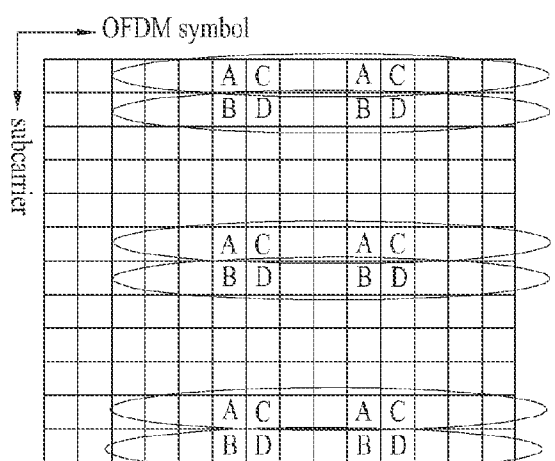
(c)

FIG. 15
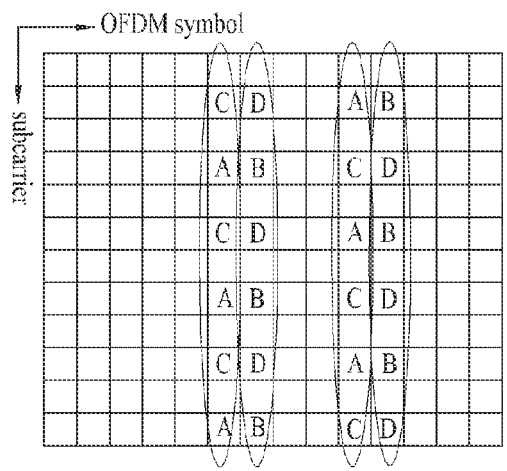
(a)
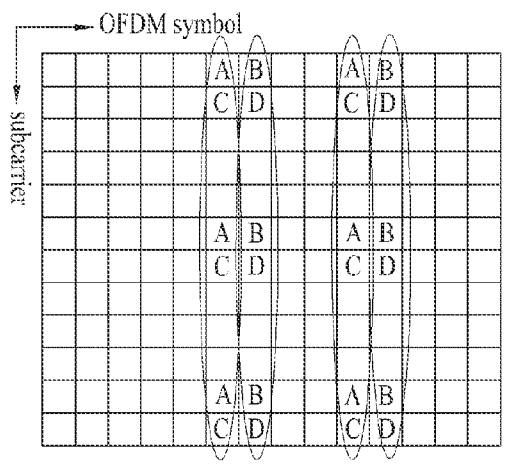
(b)
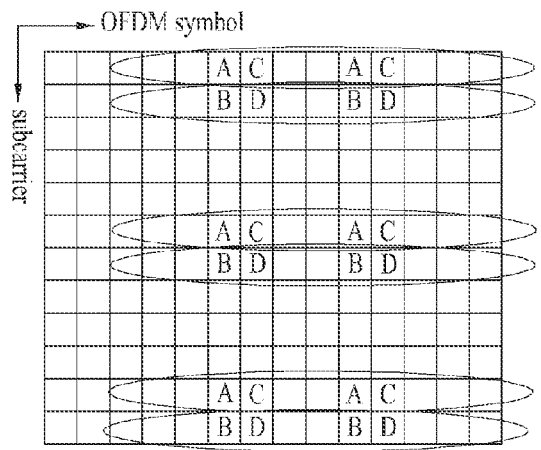
(c)

METHOD AND APPARATUS FOR TRANSMITTING DOWNLINK REFERENCE SIGNAL

CROSS-REFERENCE TO RELATED APPLICATIONS

This application is the National Stage filing under 35 U.S.C. 371 of International Application No. PCT/KR2010/004713, filed on Jul. 19, 2010, which claims the benefit of earlier filing date and right of priority to Korean Application No. 10-2010-0067856, filed on Jul. 14, 2010, and also claims the benefit of U.S. Provisional Application Ser. Nos. 61/236,894, filed on Aug. 26, 2009 and 61/226,296, filed on Jul. 17, 2009, the contents of which are all incorporated by reference herein in their entirety.

TECHNICAL FIELD

The following description relates a wireless communication system, and more particularly, to a method and apparatus for transmitting a downlink reference signal in a wireless communication system.

BACKGROUND ART

A Multiple Input Multiple Output (MIMO) system refers to a system for improving data transmission/reception efficiency using multiple transmission antennas and multiple reception antennas. MIMO technology includes a spatial diversity scheme and a spatial multiplexing scheme. The spatial diversity scheme is suitable for data transmission of a User Equipment (UE) which is in motion at high speed, because transmission reliability is increased or a cell radius is increased through diversity gain. The spatial multiplexing scheme can increase data transfer rates without increasing system bandwidth by simultaneously transmitting different data.

In a MIMO system, each transmission antenna has an independent data channel. The transmission antenna may mean a virtual antenna or a physical antenna. A receiver estimates a channel with respect to each transmission antenna and receives data transmitted from each transmission antenna. Channel estimation refers to a process of compensating for signal distortion due to fading so as to restore a received signal. Fading refers to a phenomenon in which signal intensity is rapidly changed due to multi-path and time delay in a wireless communication system environment. For channel estimation, a reference signal known to both a transmitter and a receiver is necessary. The reference signal may be abbreviated to RS or referred to as a pilot according to the standard applied.

A downlink reference signal is a pilot signal for coherent demodulation, such as a Physical Downlink Shared Channel (PDSCH), a Physical Control Format Indicator Channel (PCFICH), a Physical Hybrid Indicator Channel (PHICH), and a Physical Downlink Control Channel (PDCCH). The downlink reference signal includes a Common Reference Signal (CRS) shared among all UEs in a cell and a Dedicated Reference Signal (DRS) for a specific UE. The CRS may be referred to as a cell-specific reference signal. The DRS may be referred to as a UE-specific reference signal.

In arranging RSs on radio resources, there are several things to be considered, for example, the amount of radio resources to be allocated to the RSs, exclusive arrangement of DRSs and CRSS, the location of a control region in which a PDCCH etc. is arranged, and the density of the DRSs. If a large amount of resources is allocated to the RSs, the density of the RSs is increased and thus high channel estimation performance can be obtained. Meanwhile, if a small amount of resources is allocated to the RSs, although a high data transmission rate can be acquired, the density of the RSs is decreased and thus degradation of channel estimation performance may occur.

Accordingly, a method for efficiently arranging DRSs on radio resources so that channel estimation performance is increased and an increase of system overhead can be prevented in MIMO transmission is needed.

DETAILED DESCRIPTION OF THE INVENTION

Technical Objects

It is a technical object of the present invention to provide a method for efficiently designing DRSs in MIMO transmission and to provide a method and apparatus for transmitting DRSs appropriately arranged on radio resources so as to increase channel estimation performance and prevent an increase of system overhead.

Means for Solving the Problems

To achieve the above technical object, a method for transmitting a downlink signal using two or more layers in a base station according to an embodiment of the present invention includes multiplexing and transmitting reference signals for the two or more layers based on a reference signal pattern in a data region of a downlink subframe, and transmitting data for the two or more layers in the data region of the downlink subframe, wherein the reference signals for the two or more layers are dedicated reference signals used by a receiving end to demodulate the data for the two or more layers, and the multiplexing of the reference signals is performed using code division multiplexing of the reference signals for the two or more layers using an orthogonal code of length 2 or more.

The code division multiplexing may include time domain covering in which the orthogonal code is multiplied across two or more OFDM symbols on which the reference signals are arranged, or frequency domain covering in which the orthogonal code is multiplied across two or more subcarriers on which the reference signals are arranged.

The code division multiplexing may use orthogonal codes corresponding in number to the number of the layers.

The multiplexing of the reference signals may further include time division multiplexing of the reference signals for the two or more layers by different OFDM symbol positions, and the code division multiplexing may use orthogonal codes less in number than the number of the layers.

The multiplexing of the reference signals may further include frequency division multiplexing of the reference signals for the two or more layers by different subcarrier positions, and the code division multiplexing may use orthogonal codes less in number than the number of the layers.

The orthogonal code may be generated from a Walsh matrix or a discrete Fourier transform matrix.

The orthogonal code may be generated by cyclically repeating one row or column of the Walsh matrix or the discrete Fourier transform matrix.

The reference signal pattern may include a first reference signal group and a second reference signal group, the first reference signal group may include a first reference signal position and a second reference signal position, and the second reference signal group may include a third reference signal position and a fourth reference signal position, and the reference signals for the two or more layers may be arranged in one or more reference signal positions of the first and second reference signal groups based on the number of the layers.

To achieve the above technical object, a method for receiving a downlink signal using two or more layers in a user equipment according to another embodiment of the present invention includes receiving reference signals for the two or more layers, which are multiplexed based on a reference signal pattern in a data region of a downlink subframe, receiving data for the two or more layers in the data region of the downlink subframe, and demodulating the data for the two or more layers using the reference signals for the two or more layers, wherein the reference signals for the two or more layers are dedicated reference signals, and the multiplexing of the reference signals is performed using code division multiplexing of the reference signals for the two or more layers using an orthogonal code of length 2 or more.

The code division multiplexing may include time domain covering in which the orthogonal code is multiplied across two or more OFDM symbols on which the reference signals are arranged, or frequency domain covering in which the orthogonal code is multiplied across two or more subcarriers on which the reference signals are arranged.

The code division multiplexing may use orthogonal codes corresponding in number to the number of the layers.

The multiplexing of the reference signals may further include time division multiplexing of the reference signals for the two or more layers by different OFDM symbol positions, and the code division multiplexing may use orthogonal codes less in number than the number of the layers.

The multiplexing of the reference signals may further include frequency division multiplexing of the reference signals for the two or more layers by different subcarrier positions, and the code division multiplexing may use orthogonal codes less in number than the number of the layers.

The orthogonal code may be generated from a Walsh matrix or a discrete Fourier transform matrix.

The orthogonal code may be generated by cyclically repeating one row or column of the Walsh matrix or the discrete Fourier transform matrix.

The reference signal pattern may include a first reference signal group and a second reference signal group, the first reference signal group may include a first reference signal position and a second reference signal position, and the second reference signal group may include a third reference signal position and a fourth reference signal position, and the reference signals for the two or more layers may be arranged in one or more reference signal positions of the first and second reference signal groups based on the number of the layers.

To achieve the above technical object, a base station for transmitting a downlink signal using two or more layers according to still another embodiment of the present invention includes a plurality of antennas, a receiving module for receiving a signal from a user equipment through the plurality of antennas, a transmitting module for transmitting a signal to the user equipment through the plurality of antennas, and a processor for controlling the base station including the plurality of antennas, the reception module, and the transmission module, wherein the processor is configured to multiplex and transmit reference signals for the two or more layers based on a reference signal pattern in a data region of a downlink subframe, and transmit data for the two or more layers in the data region of the downlink subframe through the transmission module, wherein the reference signals for the two or more layers are dedicated reference signals used by the user equipment to demodulate the data for the two or more layers, and the multiplexing of the reference signals is performed using code division multiplexing of the reference signals for the two or more layers using an orthogonal code of length 2 or more.

To achieve the above technical object, a user equipment for receiving a downlink signal using two or more layers according to a further embodiment of the present invention includes a plurality of antennas, a receiving module for receiving a signal from a base station through the plurality of antennas, a transmitting module for transmitting a signal to the base station through the plurality of antennas, and a processor for controlling the base station including the plurality of antennas, the reception module, and the transmission module, wherein the processor is configured to receive reference signals for the two or more layers, which are multiplexed based on a reference signal pattern in a data region of a downlink subframe, through the reception module, receive data for the two or more layers in the data region of the downlink subframe through the reception module, and demodulate the data for the two or more layers using the reference signals for the two or more layers, wherein the reference signals for the two or more layers are dedicated reference signals, and the multiplexing of the reference signals is performed using code division multiplexing of the reference signals for the two or more layers using an orthogonal code of length 2 or more.

The above general description of the present invention and the detailed description which will be described later are exemplary and serve as an additional description of the invention as described in the claims.

Advantageous Effects

According to the above-described embodiments of the present invention, a method and apparatus for transmitting DRSs which are appropriately arranged on radio resources so as to increase channel estimation performance and to prevent increase of system overhead can be provided.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

FIG. 5 is a diagram explaining CRS and DRS patterns in a 3GPP LTE system.

FIG. 7 to FIG. 11 are diagrams explaining various embodiments of the present invention for multiplexing DRSs by a CDM scheme.

FIG. 12 to FIG. 15 are diagrams explaining various embodiments of the present invention for multiplexing DRSs using the DRS pattern of FIG. 6.

BEST MODE FOR CARRYING OUT THE INVENTION

Figure 1:
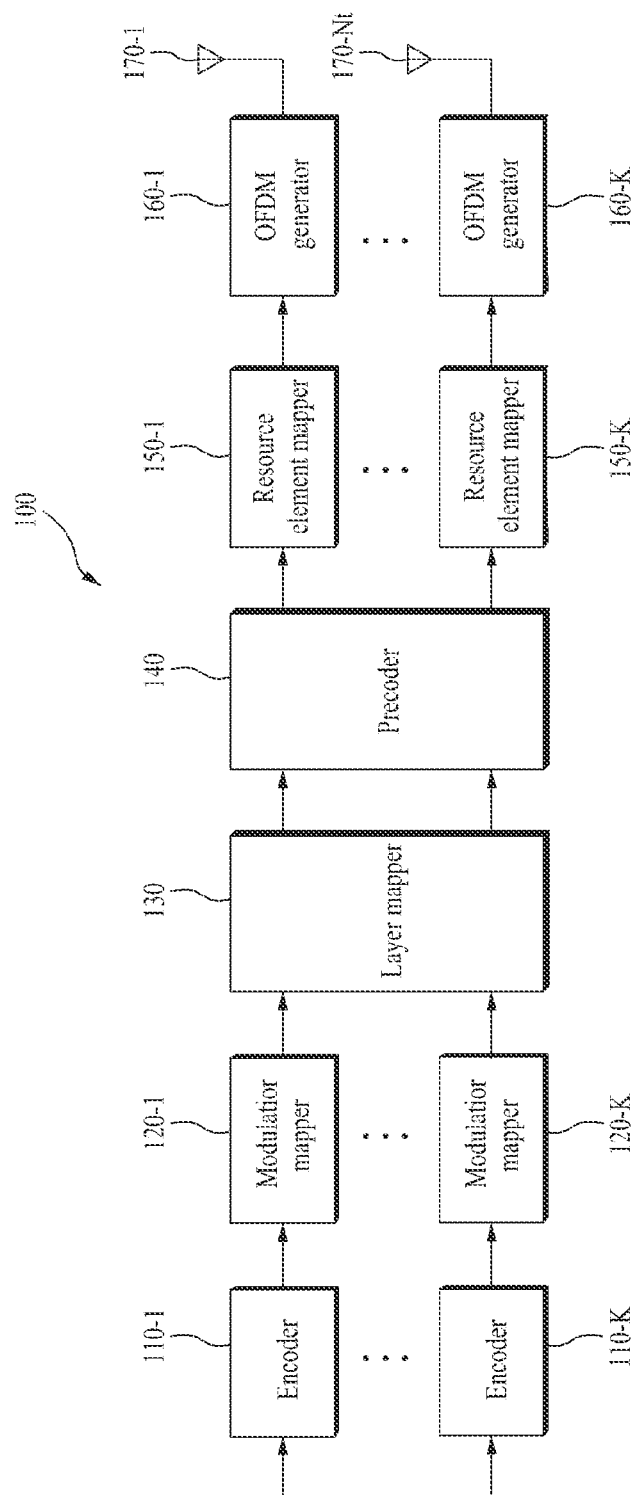
FIG. 1 is a block diagram showing the structure of a transmitter having multiple antennas.

The following embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In exemplary embodiments of the present invention, a description is made of a data transmission and reception relationship between a base station and a terminal. Here, the base station refers to a terminal node of a network communicating directly with the terminal. In some cases, a specific operation described as being performed by the base station may be performed by an upper node of the base station.

In other words, it is apparent that, in a network comprised of a plurality of network nodes including a base station, various operations performed for communication with a terminal may be performed by the base station, or network nodes other than the base station. The term 'base station' may be replaced with terms such as fixed station, Node B, eNode B (eNB), and Access Point (AP). The term 'relay' may be replaced with terms such as Relay Node (RN) and Relay Station (RS). Also, the term 'terminal' may be replaced with terms such as User Equipment (UE), Mobile Station (MS), Mobile Subscriber Station (MSS), and Subscriber Station (SS).

Specific terms used in the following description are proposed to aid in understanding the present invention, and the use of these specific terms may be changed to another format within the technical scope or spirit of the present invention.

In some instances, well-known structures and devices may be omitted in order to avoid obscuring the concepts of the present invention and the important functions of the structures and devices may be shown in block diagram form. The same reference numbers will be used throughout the drawings to refer to the same or like parts.

Exemplary embodiments of the present invention are supported by standard documents disclosed in at least one of wireless access systems including an Institute of Electrical and Electronics Engineers (IEEE) 802 system, a $3^{rd}$ Generation Project Partnership (3GPP) system, a 3GPP Long Term Evolution (LTE) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following embodiments of the present invention can be used for a variety of wireless access systems, for example, Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and the like. CDMA may be embodied through radio technology such as Universal Terrestrial Radio Access (UTRA) or CDMA2000. TDMA may be embodied through radio technology such as Global System for Mobile communications (GSM)/General Packet Radio Service (GPRS)/Enhanced Data Rates for GSM Evolution (EDGE). OFDMA may be embodied through radio technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of the Universal Mobile Telecommunications System (UMTS). 3rd Generation Partnership Project (3GPP) Long Term Evolution (LTE) is a part of the E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. WiMAX can be explained by IEEE 802.16e (WirelessMAN-OFDMA Reference System) and advanced IEEE 802.16m (WirelessMAN-OFDMA Advanced System). For clarity, the following description focuses on the 3GPP LTE and 3GPP LTE-A systems. However, technical features of the present invention are not limited thereto.

In MIMO transmission in the following description, 'rank' refers to the number of paths which can independently transmit signals and 'number of layers' refers to the number of signal streams transmitted through the respective paths. Generally, a transmitter transmits layers of a number corresponding to a rank number used for signal transmission. Accordingly, rank has the same meaning as the number of layers unless mentioned otherwise.

FIG. 1 is a block diagram showing the structure of a transmitter having multiple antennas.

Referring to FIG. 1, a transmitter 100 includes encoders 110-1, ..., 110-K, modulation mappers 120-1, ..., 120-K, a layer mapper 130, a precoder 140, resource element mappers 150-1, ..., 150-K, and OFDM signal generators 160-1, ..., 160-K. The transmitter 100 also includes Nt transmission antennas 170-1, ..., 170-Nt.

The encoders 110-1, ..., 110-K generate coded data by encoding input data according to a predetermined coding scheme. The modulation mappers 120-1, ..., 120-K map the coded data to modulation symbols representing locations on a signal constellation. A modulation scheme is not limited to a specific scheme and may be an m-Phase Shift Keying (m-PSK) or an m-Quadrature Amplitude modulation (m-QAM). For example, the m-PSK may be binary PSK (BPSK), quadrature PSK (QPSK), and 8-PSK and the m-QAM may be 16-QAM, 64-QAM, and 256-QAM.

The layer mapper 130 defines a layer of a modulation symbol so that the precoder 140 can distribute an antenna-specific symbol to a path of each antenna. The layer is defined as an information path input to the precoder 140. The information path located ahead of the precoder 140 may be called a virtual antenna or a layer.

The precoder 140 processes modulation symbols using a MIMO scheme according to the multiple transmission antennas 170-1, ..., 170-Nt and generates antenna-specific symbols. The precoder 140 distributes the antenna-specific symbols to the resource element mappers 150-1, ..., 150-K of paths of corresponding antennas. Each information path transmitted to one antenna by the precoder 140 is called a stream. The stream may correspond to a physical antenna.

The resource element mappers 150-1, ..., 150-K allocate the antenna-specific symbols to suitable resource elements and then multiplex the resultant symbols according to a user. The OFDM signal generators 160-1, ..., 160-K modulate the antenna-specific symbols according to an OFDM scheme and then output OFDM symbols. The OFDM signal generators 160-1, ..., 160-K may perform Inverse Fast Fourier Transform (IFFT) on the antenna-specific symbols. A Cyclic Prefix (CP) may be inserted into a time-domain symbol which has undergone IFFT. The CP is a signal inserted into a guard interval in order to eliminate inter-symbol interference caused by multiple paths in an OFDM transmission scheme. The OFDM symbols are transmitted through the transmission antennas 170-1, ..., 170-Nt.

Figure 2:
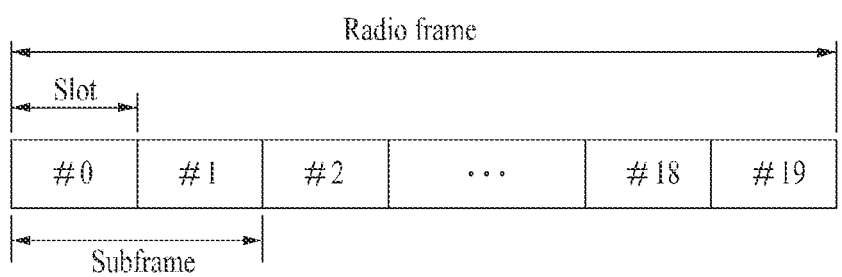
FIG. 2 is a diagram showing the structure of a downlink radio frame.

FIG. 2 is a diagram showing the structure of a downlink radio frame. Referring to FIG. 2, a downlink radio frame includes 10 subframes, each of which includes two slots. The downlink radio frame may be configured using Frequency Division Duplex (FDD) or Time Division Duplex (TDD). A time required for transmitting one subframe is defined as a Transmission Time Interval (TTI). For example, one subframe may have a length of 1 ms and one slot may have a length of 0.5 ms. One slot includes a plurality of OFDM symbols in a time domain and includes a plurality of Resource Blocks (RBs) in a frequency domain.

The number of OFDM symbols included in one slot may vary according to the configuration of a CP. The CP includes an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is less than that of the case of the normal CP. In the extended CP, for example, the number of OFDM symbols included in one slot may be 6. If a channel state is unstable, for example, if a User Equipment (UE) moves at high speed, the extended CP may be used in order to further reduce interference between symbols.

If the normal CP is used, since one slot includes 7 OFDM symbols, one subframe includes 14 OFDM symbols. At this time, the first two or three OFDM symbols of each subframe may be allocated to a Physical Downlink Control Channel (PDCCH) and the remaining OFDM symbols may be allocated to a Physical Downlink Shared Channel (PDSCH).

The structure of the radio frame is purely exemplary. Accordingly, the number of subframes included in the radio frame, the number of slots included in the subframe, or the number of symbols included in the slot may be changed in various manners.

Figure 3:
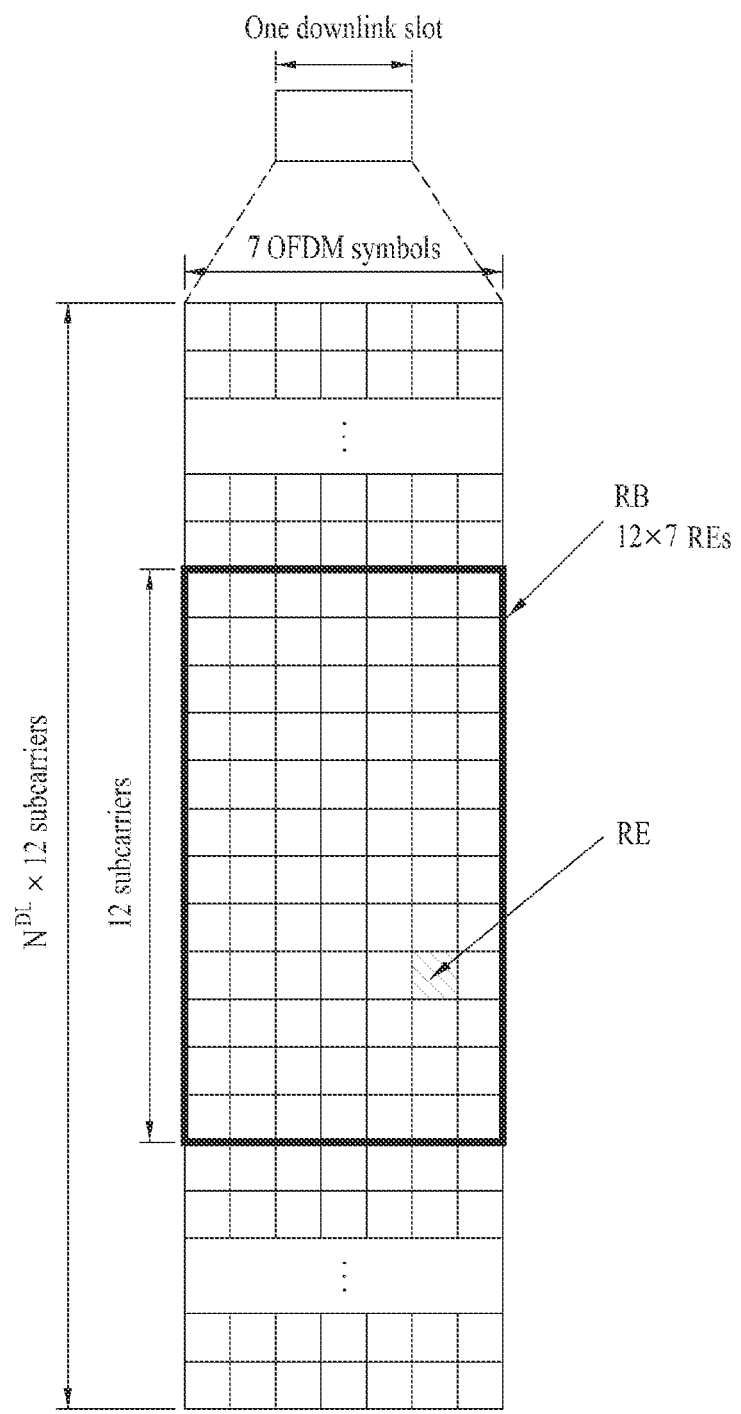
FIG. 3 is a diagram showing an example of a resource grid in one downlink slot.

FIG. 3 is a diagram showing an example of a resource grid in one downlink slot, in which OFDM symbols are configured by the normal CP. Referring to FIG. 3, a downlink slot includes a plurality of OFDM symbols in a time domain and includes a plurality of RBs in a frequency domain. Although FIG. 2 exemplarily depicts that one downlink slot includes 7 OFDM symbols and one RB includes 12 subcarriers, the present invention is not limited thereto. Each element of the resource grid is referred to as a Resource Element (RE). For example, an RE a(k,l) is located at a k-th subcarrier and an l-th OFDM symbol. One RB includes 12×7 REs. Since each subcarrier interval is set to 15 kHz, one RB includes about 180 kHz in the frequency domain. $N^{DL}$ denotes the number of RBs included in the downlink slot. $N^{DL}$ may be determined based on downlink transmission bandwidth configured by scheduling of a Base Station (BS).

Figure 4:
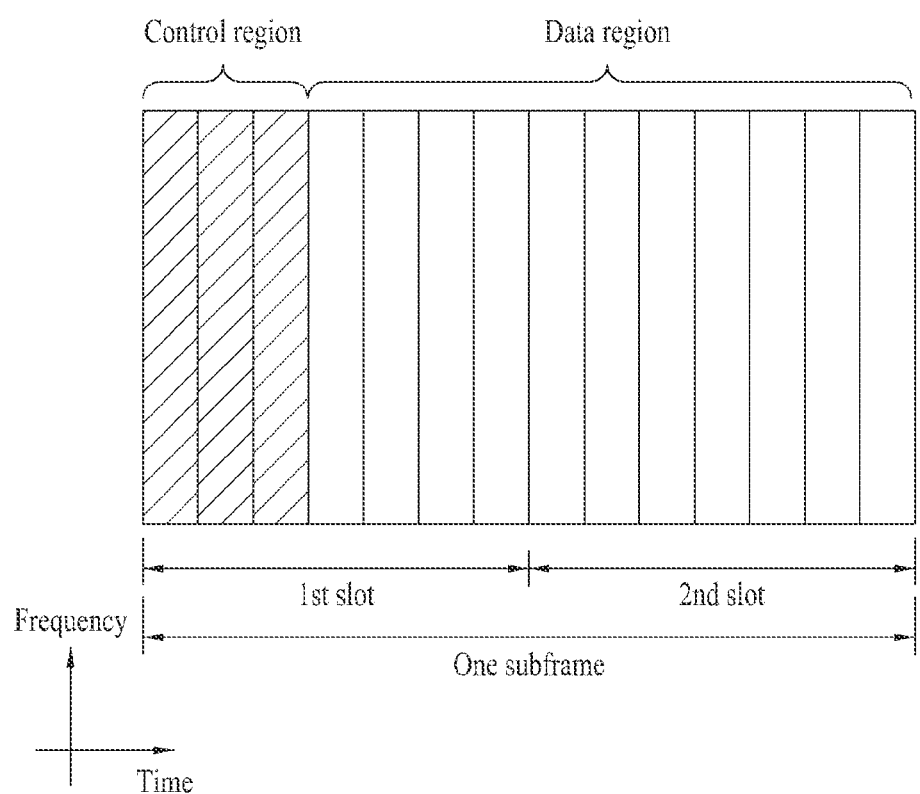
FIG. 4 is a diagram showing the structure of a downlink subframe.

FIG. 4 is a diagram showing the structure of a downlink subframe. A maximum of 3 OFDM symbols of a front portion of a first slot within one subframe corresponds to a control region to which a control channel is allocated. The remaining OFDM symbols correspond to a data region to which a Physical Downlink Shared Channel (PDSCH) is allocated. Examples of the downlink control channels used in the 3GPP LTE system include a Physical Control Format Indicator Channel (PCFICH), a Physical Downlink Control Channel (PDCCH), a Physical Hybrid automatic repeat request Indicator Channel (PHICH), etc. The PCFICH is transmitted in a first OFDM symbol of a subframe, and includes information about the number of OFDM symbols used to transmit the control channel in the subframe. The PHICH includes a HARQ ACK/NACK signal as a response to uplink transmission. Control information transmitted through the PDCCH is referred to as Downlink Control Information (DCI). The DCI includes uplink or downlink scheduling information or an uplink transmission power control command for a certain UE group. The PDCCH may include resource allocation and transmission format of a Downlink Shared Channel (DL-SCH), resource allocation information of an Uplink Shared Channel (UL-SCH), paging information of a Paging Channel (PCH), system information of the DL-SCH, resource allocation of a higher layer control message such as a random access response transmitted over the PDSCH, a set of transmission power control commands for individual UEs in a certain UE group, transmission power control information, activation of Voice over IP (VoIP), etc. A plurality of PDCCHs may be transmitted within the control region. The UE may monitor the plurality of PDCCHs. The PDCCHs are transmitted by a combination of one or more contiguous Control Channel Elements (CCEs). The CCE is a logical allocation unit used to provide the PDCCHs at a coding rate based on the state of a radio channel. The CCE corresponds to a plurality of resource element groups. The format of the PDCCH and the number of available bits are determined based on a correlation between the number of CCEs and the coding rate provided by the CCEs. The BS determines a PDCCH format according to a DCI to be transmitted to the UE, and adds a Cyclic Redundancy Check (CRC) to control information. The CRC is masked with a Radio Network Temporary Identifier (RNTI) according to an owner or usage of the PDCCH. If the PDCCH is for a specific UE, a cell-RNTI (C-RNTI) of the UE may be masked to the CRC. Alternatively, if the PDCCH is for a paging message, a paging indicator identifier (P-RNTI) may be masked to the CRC. If the PDCCH is for system information (more specifically, a System Information Block (SIB)), a system information identifier and a System Information RNTI (SI-RNTI) may be masked to the CRC. To indicate a random access response that is a response for transmission of a random access preamble of the UE, a Random Access-RNTI (RA-RNTI) may be masked to the CRC.

FIG. 5 is a diagram explaining CRS and DRS patterns in a 3GPP LTE system.

FIG. 5 is a diagram explaining REs to which CRSs and DRSs are mapped in a normal CP case. In FIG. 5, the horizontal axis denotes a time domain and the vertical axis denotes a frequency domain. In relation to an RS pattern in the normal CP case, 14 OFDM symbols in the time domain and 12 subcarriers in the frequency domain may be a basic unit of an RB. In an extended CP case, 12 OFDM symbols and 12 subcarriers may be a basic unit of an RB of the RS pattern. In the time-frequency domain shown in FIG. 5, the smallest rectangular region corresponds to one OFDM symbol in the time domain and one subcarrier in the frequency domain.

In FIG. 5, Rp denotes an RE used to transmit an RS over a p-th antenna port. For example, R0 to R3 denote REs to which CRSs transmitted over zeroth to third antenna ports, respectively, are mapped. R5 denotes an RE to which a DRS transmitted over a fifth antenna port is mapped. CRSs transmitted over the zeroth and first antenna ports are transmitted on zeroth, fourth, seventh, and eleventh OFDM symbols at an interval of 6 subcarriers (based on one antenna port). CRSS transmitted over the second and third antenna ports are transmitted on first and eighth OFDM symbols at an interval of 6 subcarriers (based on one antenna port). DRSs are transmitted on 3rd, 6th, 9th, and 12th OFDM symbols of every subframe at an interval of 4 subcarriers. Accordingly, 12 DRSs are transmitted in two RBs (RB pair) of one subframe, which are contiguous in the time domain.

A CRS (or cell-specific RS) is used to estimate a channel of a physical antenna stage and is commonly transmitted to all UEs in a cell. Channel information estimated by the UEs through the CRS may be used to demodulate data transmitted using a transmission scheme, such as single antenna transmission, transmit diversity, closed-loop spatial multiplexing, or open-loop spatial multiplexing, Multi-User MIMO (MU-MIMO), and may be used for a channel measurement report of the UEs to the BS. To increase channel estimation performance through CRSs, the locations of the CRSs in a subframe may become different by being shifted according to a cell. For example, if RSs are located every three subcarriers, a certain cell may arrange the RSs at an interval of 3 k and another cell may arrange the RSs at an interval of (3 k+1).

A DRS (or UE-specific RS) is used to demodulate data and enables the UE to estimate an equivalent channel of a combination of a transport channel and a precoding weight transmitted by each transmission antenna when the UE receives the RS, by applying the precoding weight used for a specific UE during MIMO transmission to the RS. The DRS requires orthogonality between transport layers.

A legacy 3GPP LTE system supports a maximum of 4 transmission antennas, and defines cell-specific RSs for a single transmission antenna, two transmission antennas, and four transmission antennas, and UE-specific RSs for rank 1 beamforming. Meanwhile, in an LTE-Advanced (LTE-A) system, which is an evolved version of the 3GPP LTE, MIMO of a high order, multiple-cell transmission, advanced MU-MIMO, etc. are considered. To support an advanced transmission scheme together with efficient operation of RSs, RS-based data demodulation is considered. Moreover, it is desirable that DRSs be configured to be present only in RBs and layers in which downlink transmission is scheduled by the BS.

In arranging DRSs for supporting transmission of a maximum of rank 8 on a wireless resource, DRSs for individual layers are multiplexed. Time Division Multiplexing (TDM) indicates that DRSs for two or more layers are arranged on different time resources (e.g. OFDM symbols). Frequency Division Multiplexing (FDM) indicates that DRSs for two or more layers are arranged on different frequency resources (e.g. subcarriers). Code Division Multiplexing (CDM) indicates that DRSs for two or more layers arranged in the same radio resource are multiplexed using an orthogonal sequence (or orthogonal covering).

Hereinafter, embodiments of the present invention for DRS patterns will be described in which a receiver can perform efficient channel estimation and data restoration with respect to a maximum of rank 8 transmission in consideration of the above description.

Figure 6:
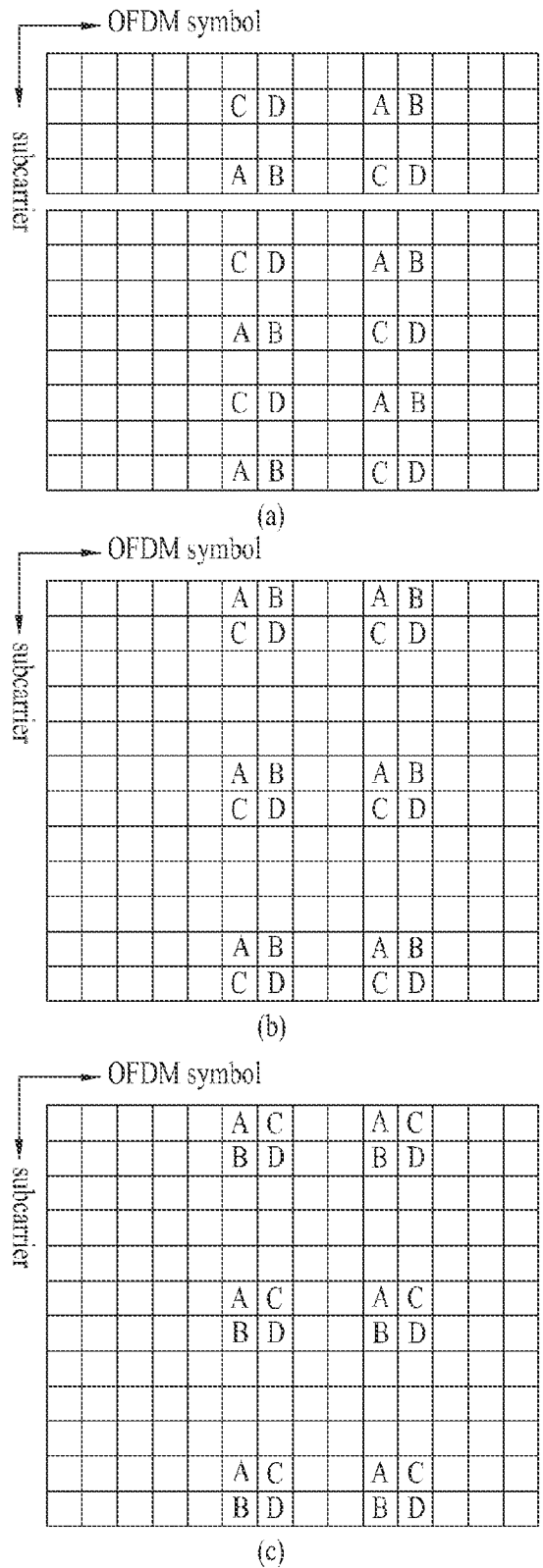
FIG. 6 is a diagram explaining DRS patterns according to an embodiment of the present invention.

FIG. 6 is a diagram explaining DRS patterns according to an embodiment of the present invention.

The positions of DRSs for a maximum of rank 8 transmission are represented by A, B, C, and D in one RB (an RB including 14 OFDM symbols and 12 subcarriers in a normal CP case or an RB including 12 OFDM symbols and 12 subcarriers in an extended CP case).

In FIG. 6(a) to FIG. 6(c), each of A, B, C, and D representing the positions of the DRSs may be arranged on 6 REs in one RB. For example, DRSs represented by A may be located on two OFDM symbols in the time domain and may be located on three subcarriers in the frequency domain on one OFDM symbol. Namely, the DRSs may be designed to maintain the same interval in the frequency domain at a certain interval in the time domain. DRSs represented by B, C, and D may also be located on REs in a similar way, and REs on which DRSs represented by A, B, C, and D are located do not overlap with each other. Accordingly, the DRSs represented by A, B, C, and D may be located on 24 REs in one RB.

In FIG. 6(a), each of A, B, C, and D indicating the DRS positions may be arranged on two OFDM symbols and may be arranged on different frequencies (subcarriers) on the two OFDM symbols. A DRS located on any one of the two OFDM symbols may have a frequency offset of a predetermined interval compared with a DRS located on the other OFDM symbol. The frequency offset may refer to an offset of one or more subcarriers and may mean ½ a frequency interval at which DRSs are arranged on any one OFDM symbol. For example, the DRS represented by A in FIG. 6(a) is located on the sixth and tenth OFDM symbols in one RB, and the frequency position of the DRS on the sixth OFDM symbol has an offset of two subcarriers compared with the frequency position of the DRS on the tenth OFDM symbol. The DRSs represented by A, B, C, and D are arranged not to be contiguous in the frequency domain and may be arranged to be contiguous or to have a certain interval in the time domain.

In FIG. 6(b) and FIG. 6(c), each of A, B, C, and D indicating DRS positions may be arranged on two OFDM symbols and may be arranged on the same frequency (subcarrier) on the two OFDM symbols. For example, the DRSs represented by A in FIG. 6(b) and FIG. 6(b) are located on the sixth and tenth OFDM symbols in one RB, and the frequency position of the DRS on the sixth OFDM symbol is the same as the frequency position of the DRS on the tenth OFDM symbol. The DRSs represented by A, B, C, and D are arranged to be contiguous in the frequency domain and may be arranged to be contiguous or to have a certain interval in the time domain.

In determining the positions of REs on which DRSs are arranged in one RB, the following may be considered.

DRSs may be configured not to be arranged in a control region (three OFDM symbols of the front portion of the first slot) in which PDCCHs etc. are located. Further, DRSs may not be arranged on OFDM symbols (e.g. first, second, and fifth OFDM symbols of the first slot, and first, second, and fifth OFDM symbols of the second slot) on which CRSs are located. In consideration of the case in which a relay is introduced and a guard time for switching of a transmission mode and a reception mode of the relay is configured on the last OFDM symbol of the second slot and the case where the position of a sounding RS is located on an OFDM symbol immediately in front of the last OFDM symbol, DRSs may not be arranged on the last two OFDM symbols of the second slot.

However, if the above-described restrictions of the DRS arrangement are all applied, channel estimation performance caused by DRSs may be deteriorated. Namely, since data is restored by estimating a channel for REs on which DRSs are not located, by interpolation and/or extrapolation of the DRSs, if the DRSs are located only on specific OFDM symbols, channel estimation performance may be relatively inefficient compared with when the DRSs are distributed over several OFDM symbols. Therefore, the DRSs may be appropriately arranged according to circumstance. Namely, the above-described restrictions of the DRS arrangement need not be considered or one or more restrictions may be considered.

In relation to the DRS arrangement pattern according to the present invention, A, B, C, and D representing DRS positions may be grouped as shown in Table 1.

TABLE 1

|             | Case 1 | Case 2 | Case 3 |
|-------------|--------|--------|--------|
| DRS group #0 | A, B   | A, C   | A, D   |
| DRS group #1 | C, D   | B, D   | B, C   |

The DRS group #0 and the DRS group #1 are used for groups of different antenna ports (or layers). The antenna port may refer to a virtual antenna port or a physical antenna port. For example, the DRS group #0 may indicate DRS positions for first to fourth antenna ports, and the DRS group #1 may indicate DRS positions for fifth to eighth antenna ports. In the following embodiment, a description is given of the case where A and B represent DRS positions for one antenna port group, and C and D represent DRS positions for another antenna port group, as in the case 1 of Table 1. However, the present invention is not limited thereto, and A, C and B, D, or A, D and B C may represent DRS positions for different antenna port groups, as in case 2 or case 3 of Table 1.

In addition, according to a DRS multiplexing scheme, it may be determined for which antenna ports (or layers) A, B, C, and D represent DRS positions. For example, in A and B of the DRS group #0, A may represent a DRS position for one antenna port and B may represent a DRS position for another antenna port when the multiplexing scheme is TDM or FDM. In the case of a CDM multiplexing scheme, A and B represent DRS positions for one antenna port, and different antenna ports are distinguished by orthogonal codes.

Hereinafter, a DRS group used for rank 1 to rank 8 will be described.

Throughout description of the specification hereinbelow, the term 'layer', 'virtual antenna port', or 'physical antenna port' will be collectively referred to as the term 'layer'. In more detail, the term 'layer' used in the present specification has its essential meaning and simultaneously may be replaced with the term 'virtual antenna port' or 'physical antenna port' in some cases.

In rank 1 transmission, either the DRS group #0 or the DRS group #1 is used and all DRS positions within the DRS group are used. For example, when the DRS group #0 is used, DRSs for a corresponding layer are arranged on all REs represented by A and B, and DRSs for one layer are arranged on 12 REs within one RB.

In rank 2 transmission, either the DRS group #0 or the DRS group #1 is used, and DRSs for two layers may be multiplexed by TDM/FDM/CDM within the DRS group. For example, when the DRS group #0 is used, an RE represented by A denotes a DRS position for a first layer and an RE represented by B denotes a DRS position for a second layer, in the case of TDM/FDM. FIG. 6(a) or FIG. 6(b) corresponds to a TDM scheme (A and B are distinguished by being arranged on different OFDM symbols on the same subcarrier) and FIG. 6(c) corresponds to an FDM scheme (A and B are distinguished by being arranged on different subcarriers on the same OFDM symbol). Meanwhile, in the case of a CDM scheme, both A and B represent DRS positions for the first and second layers, and DRSs for the first and second may be distinguished by codes.

In rank 3 transmission, both the group #0 and #1 may be used to multiplex DRSs for 3 different layers according to a TDM/FDM scheme. For example, DRS positions for first and second layers may be arranged on A and B of the DRS group #0 and DRS positions for a third layer may be arranged on C (or D) of the DRS group #1. Meanwhile, in rank 3 transmission, if DRSs for 3 different layers are multiplexed according to the CDM scheme, both the DRS groups #0 and #1 may be used or either the DRS group #0 or #1 may be used. This will be described later in detail.

In rank 4 transmission, both group #0 and #1 may be used to multiplex DRSs for 4 different layers according to the TDM/FDM scheme. For example, DRS positions for first and second layers may be arranged on A and B of the DRS group #0 and DRS positions for third and fourth layers may be arranged on C and D of the DRS group #1. Meanwhile, in rank 4 transmission, if DRSs for 4 different layers are multiplexed according to the CDM scheme, both the DRS groups #0 and #1 may be used or either the DRS group #0 or #1 may be used.

The above description may be commonly applied to various embodiments of the present invention.

Hereinbelow, a CDM scheme using orthogonal covering in a DRS multiplexing scheme will be described. For CDM of DRSs, orthogonal covering such as a Walsh code, or Discrete Fourier Transform (DFT) matrix may be used.

The Walsh code is composed of a square matrix and $2^n$ signals may be distinguished using a Walsh code matrix. The Walsh code may be composed of a matrix shown in Table 2.

TABLE 2

$$H_n = \begin{bmatrix} H_{n-1} & H_{n-1} \\ H_{n-1} & -H_{n-1} \end{bmatrix},$$

where $H_1 = 1$ $$H_2 = \begin{bmatrix} 1 & 1 \\ 1 & -1 \end{bmatrix}, H_3 = \begin{bmatrix} 1 & 1 & 1 & 1 \\ 1 & -1 & 1 & -1 \\ 1 & 1 & -1 & -1 \\ 1 & -1 & -1 & 1 \end{bmatrix}$$

The DFT matrix is composed of a square matrix and may has a size of N×N (where N is a natural number). When the DFT matrix is used as an orthogonal sequence for CDM, a normalization factor $1/\sqrt{N}$ may be omitted. The DFT matrix may be composed of a matrix shown in Table 3.

TABLE 3

$$D_N = \frac{1}{\sqrt{N}} \begin{bmatrix} 1 & 1 & \cdots & 1 \\ 1 & e^{j2\pi \frac{1\cdot 1}{N}} & \cdots & e^{j2\pi \frac{1\cdot(k-1)}{N}} \\ \vdots & \vdots & \ddots & \vdots \\ 1 & e^{j2\pi \frac{(n-1)\cdot 1}{N}} & \cdots & e^{j2\pi \frac{(n-1)\cdot(k-1)}{N}} \end{bmatrix}$$

$$D_1 = 1, D_2 = \frac{1}{\sqrt{2}} \begin{bmatrix} 1 & 1 \\ 1 & -1 \end{bmatrix}$$

$$D_3 = \frac{1}{\sqrt{3}} \begin{bmatrix} 1 & 1 & 1 \\ 1 & e^{j\frac{2\pi}{3}} & e^{j\frac{4\pi}{3}} \\ 1 & e^{j\frac{4\pi}{3}} & e^{j\frac{8\pi}{3}} \end{bmatrix}$$

TABLE 3-continued $$D_4 = \frac{1}{\sqrt{4}} \begin{bmatrix} 1 & 1 & 1 & 1 \\ 1 & j & -1 & -j \\ 1 & -1 & 1 & -1 \\ 1 & -j & -1 & j \end{bmatrix}$$

A method for multiplexing DRSs using a CDM scheme using orthogonal covering will now be described with reference to FIG. 7. In FIG. 7, a sequence transmitted as a DRS is denoted by S"(i) (where n is a layer index). The sequence S"(i) may be a specific code stream or a certain value.

As shown in FIG. 7(a), DRSs present in the same time position and different frequency positions may be multiplexed using orthogonal covering. Although FIG. 7(a) shows that REs on which the DRSs are arranged are contiguous in the frequency domain, the present invention is not limited thereto and REs on which the DRSs are arranged may not be contiguous in the frequency domain. REs on which the DRSs for first and second layers of FIG. 7(a) are arranged represent REs of the same position.

For example, at least two DRSs may be used to apply DRSs for distinguishing between channels of two layers. To estimate the channel of the first layer, the same sequence $S^1(i)$ is transmitted to two DRSs. Accordingly, $S^1(i)$ and $S^1(i)$ may be transmitted to two DRS positions for the first layer. This may be expressed by multiplication of an orthogonal cover (1, 1) of a first row of an orthogonal matrix of size 2 (Walsh matrix $H_2$ or DFT matrix $D_2$) by a sequence transmitted to the two DRS positions for the first layer.

To estimate the channel of the second layer, the same sequence $S^2(i)$ is transmitted to two DRSs and one of the two DRSs, (e.g. the DRS represented by B), may be multiplied by an orthogonal phase (e.g. '−1'). Accordingly, $S^2(i)$ and $-S^2(i)$ may be transmitted to two DRS positions for the second layer. This may be expressed by multiplication of an orthogonal cover (1, −1) of a second row of an orthogonal matrix of size 2 (Walsh matrix $H_2$ or DFT matrix $D_2$) by a sequence transmitted to the two DRS positions for the second layer. In this case, the sequence $S^1(i)$ for the first layer may be the same as the sequence $S^2(i)$ for the second layer or may be different from the sequence $S^2(i)$ for the second layer.

As shown in FIG. 7(b), DRSs present in the same frequency position and different time positions may be multiplexed using orthogonal covering. Although FIG. 7(b) shows that REs on which the DRSs are arranged are contiguous in a time domain, the present invention is not limited thereto and REs on which the DRSs are arranged need not be contiguous in the time domain. REs on which the DRSs for first and second layers of FIG. 7(b) are arranged represent REs of the same positions.

For example, to estimate the channel of the first layer, the same sequence $S^1(i)$ is transmitted to two DRSs. Namely, $S^1(i)$ and $S^1(i)$ may be transmitted to two DRS positions for the first layer. This may be expressed by multiplication of an orthogonal cover (1, 1) of a first row of an orthogonal matrix of size 2 (Walsh matrix $H_2$ or DFT matrix $D_2$) by a sequence transmitted to the two DRS positions for the first layer.

To estimate the channel of the second layer, the same sequence $S^2(i)$ is transmitted to two DRSs and one of the two DRSs, (e.g. the DRS represented by B), may be multiplied by an orthogonal phase (e.g. '−1'). Accordingly, $S^2(i)$ and $-S^2(i)$ may be transmitted to two DRS positions for the second layer. This may be expressed by multiplication of an orthogonal cover (1, −1) of a second row of an orthogonal matrix of size 2 (Walsh matrix $H_2$ or DFT matrix $D_2$) by a sequence transmitted to the two DRS positions for the second layer.

Hereinafter, a method for multiplexing DRSs by a CDM scheme using orthogonal covering in the case of rank 3 and rank 4 will be described.

With reference to FIG. 8, a description will now be made of the case in which at least three DRSs are used when DRSs for distinguishing between the channels of three layers are transmitted. Three DRSs may be present on three different subcarrier positions on the same OFDM symbol (FIG. 8(a)) and may be present on three different OFDM symbol positions on the same subcarrier (FIG. 8(b)). Although FIG. 8 shows that REs on which the DRSs are arranged are contiguous in the time or frequency domain, the present invention is not limited thereto and REs on which the DRSs are arranged need not be contiguous in the time or frequency domain. REs on which the DRSs for first to third layers of FIG. 8 are arranged represent RSs of the same positions.

For example, to estimate the channel of the first layer, the same sequence $S^1(i)$ is transmitted to three DRSs. Namely, $S^1(i)$, $S^1(i)$, and $S^1(i)$ are transmitted to three DRS positions. This may be expressed by multiplication of an orthogonal cover (1, 1, 1) of a first row of an orthogonal matrix of size 3 (DFT matrix $D_3$) by a sequence transmitted to the three DRS positions for the first layer.

To estimate the channel of the second layer, the same sequence $S^2(i)$ is transmitted to three DRSs and two of the three DRSs may be multiplied by an orthogonal phase. An example of the multiplied orthogonal phase may be $e^{j(2\pi/3)}$ and $e^{j(4\pi/3)}$ when the DFT matrix is used as an orthogonal sequence. In this case, $S^2(i)$, $e^{j(2\pi/3)} \cdot S^2(i)$, and $e^{j(4\pi/3)} \cdot S^2(i)$ may be transmitted to three DRS positions for the second layer. This may be expressed by multiplication of an orthogonal cover $(1, e^{j(2\pi/3)}, e^{1(4\pi/3)})$ of a second row of an orthogonal matrix of size 3 (DFT matrix $D_3$) by a sequence transmitted to the three DRS positions for the second layer.

To estimate the channel of the third layer, the same sequence $S^3(i)$ is transmitted to three DRSs and two of the three DRSs may be multiplied by orthogonal phases $e^{j(4\pi/3)}$ and $e^{j(8\pi/3)}(=e^{j(2\pi/3)})$. In this case, $S^3(i)$, $e^{j(4\pi/3)} \cdot S^3(i)$, and $e^{j(2\pi/3)} \cdot S^3(i)$ may be transmitted to three DRS positions for the third layer. This may be expressed by multiplication of an orthogonal cover $(1, e^{j(4\pi/3)}, e^{j(8\pi/3)})$ of a third row of an orthogonal matrix of size 3 (DFT matrix $D_3$) by a sequence transmitted to the three DRS positions for the third layer.

Figure 9:
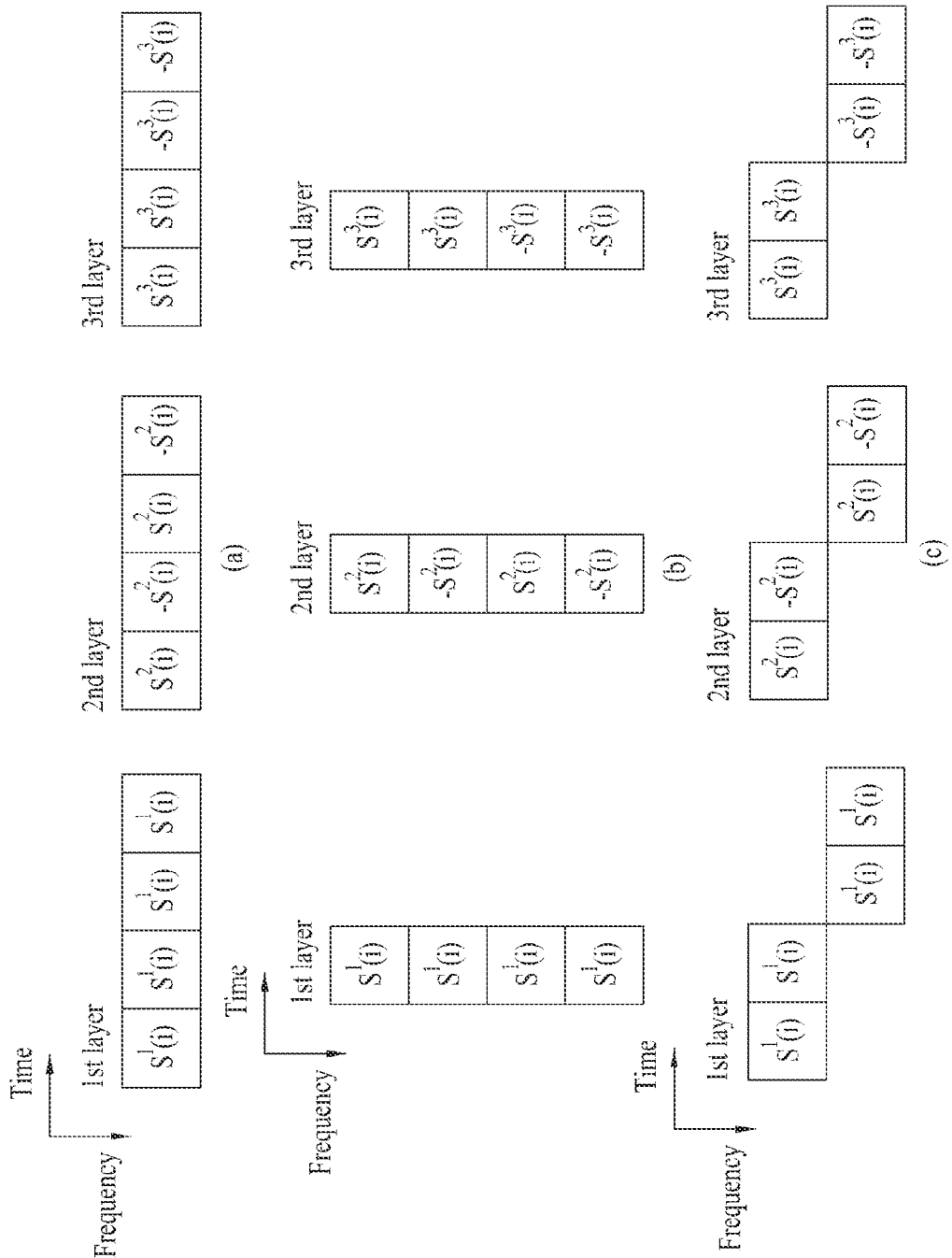

A description will now be made of the case in which at least four DRSs are used when DRSs for distinguishing between the channels of three layers are transmitted. Four DRSs may be present on four different subcarrier positions on the same OFDM symbol (FIG. 9(a)) and may be present on four different OFDM symbol positions on the same subcarrier (FIG. 9(b)). Alternatively, four DRSs may be present on two different OFDM symbol positions on the same one subcarrier and on two different OFDM symbol positions on another subcarrier (FIG. 9(c)). Although FIG. 9 shows that REs on which the DRSs are arranged are contiguous in the time or frequency domain, the present invention is not limited thereto and REs on which the DRSs are arranged may not be contiguous in the time or frequency domain. REs on which the DRSs for first to third layers of FIG. 9 are arranged represent REs of the same positions.

If at least four DRSs are used during DRS transmission to distinguish between channels of three layers, three certain rows or columns of a DFT matrix $D_4$ of size 4 or a Walsh matrix $H_3$ of size 4 may be used as orthogonal covering. It is assumed that, for example, first to third rows of the Walsh matrix $H_3$ are used. To estimate the channel of the first layer, the same sequence $S^1(i)$ is transmitted to four DRSs and a first row (1, 1, 1, 1) of the Walsh matrix $H_3$ is multiplied. That is, $S^1(i)$, $S^1(i)$, $S^1(i)$, and $S^1(i)$ are transmitted to four DRS positions. To estimate the channel of the second layer, the same sequence $S^2(i)$ is transmitted to four DRSs and a second row (1, −1, 1, −1) of the Walsh matrix $H_3$ is multiplied. That is, $S^2(i)$, $-S^2(i)$, $S^2(i)$, and $-S^2(i)$ are transmitted to four DRS positions. To estimate the channel of the third layer, the same sequence $S^3(i)$ is transmitted to four DRSs and a third row (1, 1, −1, −1) of the Walsh matrix $H_3$ is multiplied. That is, $S^3(i)$, $S^3(i)$, $-S^3(i)$, and $-S^3(i)$ are transmitted to four DRS positions. In this case, the sequences $S^1(i)$, $S^2(i)$, and $S^3(i)$ may be the same as or different from one another.

Figure 10:
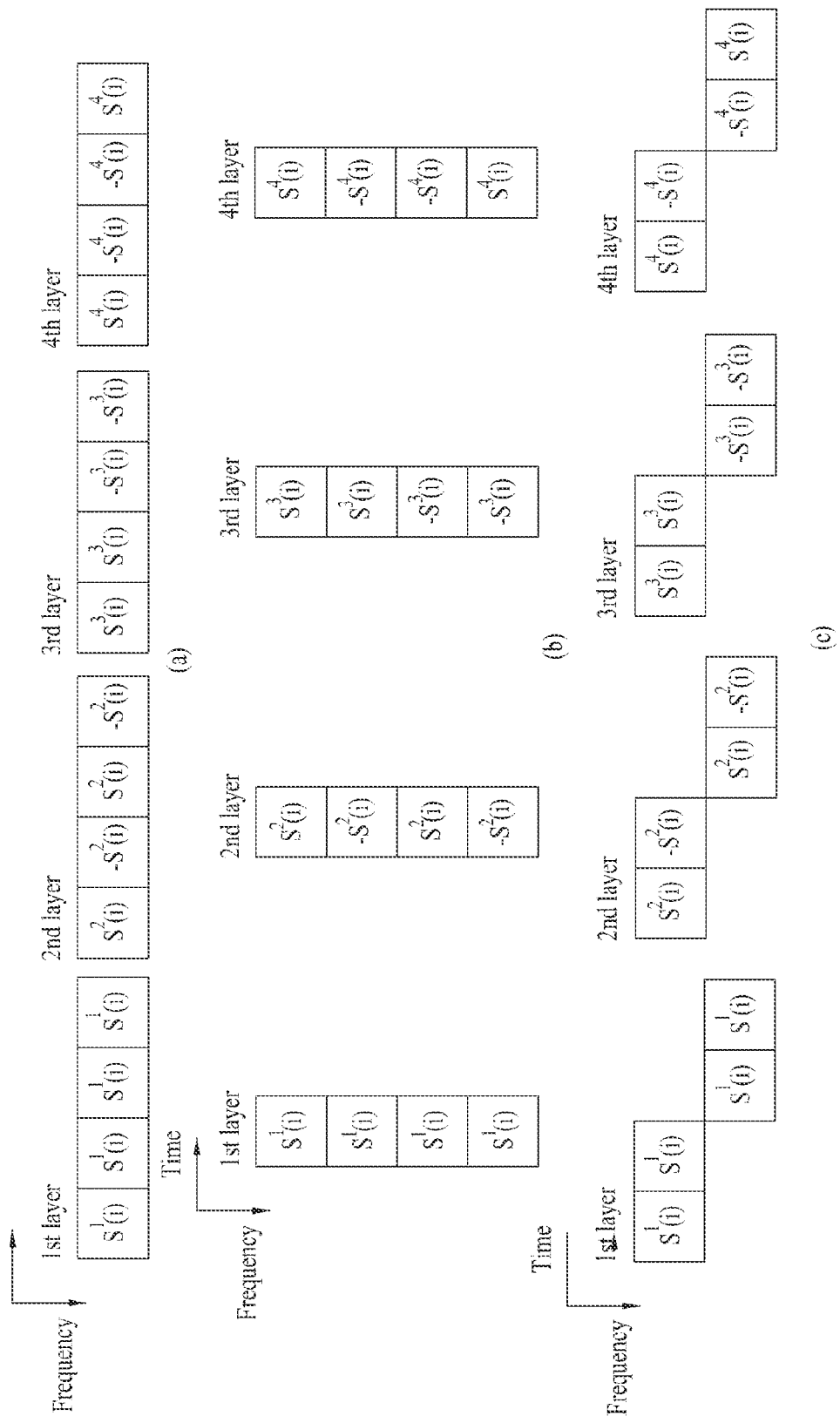

A description will now be made of the case in which at least four DRSs are used when DRSs for distinguishing between the channels of four layers are transmitted with reference to FIG. 10. Four DRSs may be present on four different subcarrier positions on the same OFDM symbol (FIG. 10(a)) and may be present on four different OFDM symbol positions on the same subcarrier (FIG. 10(b)). Alternatively, four DRSs may be present on two different OFDM symbol positions on the same subcarrier and on two different OFDM symbol positions on another subcarrier (FIG. 10(c)). Although FIG. 10 shows that REs on which the DRSs are arranged are contiguous in a time or frequency domain, the present invention is not limited thereto and REs on which the DRSs are arranged may not be contiguous in the time or frequency domain. REs on which the DRSs for first to fourth layers of FIG. 10 are arranged represent RES of the same positions.

If at least four DRSs are used during DRS transmission for distinguishing between channels of four layers, rows or columns of a DFT matrix $D_4$ of size 4 or a Walsh matrix $H_3$ of size 4 may be used as orthogonal covering.

It is assumed that, for example, a Walsh matrix $H_3$ is used. To estimate the channel of the first layer, the same sequence $S^1(i)$ is transmitted to four DRSs and a first row (1, 1, 1, 1) of the Walsh matrix $H_3$ is multiplied. That is, $S^1(i)$, $S^1(i)$, $S^1(i)$, and $S^1(i)$ are transmitted to four DRS positions. To estimate the channel of the second layer, the same sequence $S^2(i)$ is transmitted to four DRSs and a second row (1, −1, 1, −1) of the Walsh matrix $H_3$ is multiplied. That is, $S^2(i)$, $-S^2(i)$, $S^2(i)$, and $-S^2(i)$ are transmitted to four DRS positions. To estimate the channel of the third layer, the same sequence $S^3(i)$ is transmitted to four DRSs and a third row (1, 1, −1, −1) of the Walsh matrix $H_3$ is multiplied. That is, $S^3(i)$, $S^3(i)$, $-S^3(i)$, and $-S^3(i)$ are transmitted to four DRS positions. To estimate the channel of the fourth layer, the same sequence $S^4(i)$ is transmitted to four DRSs and a fourth row (1, −1, −1, 1) of the Walsh matrix $H_3$ is multiplied. That is, $S^4(i)$, $-S^4(i)$, $-S^4(i)$, and $S^4(i)$ are transmitted to four DRS positions. In this case, the sequences $S^1(i)$, $S^2(i)$, $S^3(i)$, and $S^4(i)$ may be the same as or different from one another.

It is assumed that, for example, a DFT matrix $D_4$ is used. To estimate the channel of the first layer, the same sequence $S^1(i)$ is transmitted to four DRSs and the first row (1, 1, 1, 1) of the DFT matrix $D_4$ is multiplied. That is, $S^1(i)$, $S^1(i)$, $S^1(i)$, and $S^1(i)$ are transmitted to four DRS positions. To estimate the channel of the second layer, the same sequence $S^2(i)$ is transmitted to four DRSs and a second row (1, j, −1, −j) of the DFT matrix $D_4$ is multiplied. That is, $S^2(i)$, $jS^2(i)$, $-S^2(i)$, and $-jS^2(i)$ are transmitted to four DRS positions. To estimate the channel of the third layer, the same sequence $S^3(i)$ is transmitted to four DRSs and a third row (1, −1, 1, −1) of the DFT matrix $D_4$ is multiplied. That is, $S^3(i)$, $-S^3(i)$, $S^3(i)$, and $-S^3(i)$ are transmitted to four DRS positions. To estimate the channel of the fourth layer, the same sequence $S^4(i)$ is transmitted to four DRSs and a fourth row (1, −j, −1, j) of the DFT matrix $D_4$ is multiplied. That is, $S^4(i)$, $-jS^4(i)$, $-S^4(i)$, and $jS^4(i)$ are transmitted to four DRS positions. In this case, the sequences $S^1(i)$, $S^2(i)$, $S^3(i)$, and $S^4(i)$ may be the same as or different from one another.

Figure 11:
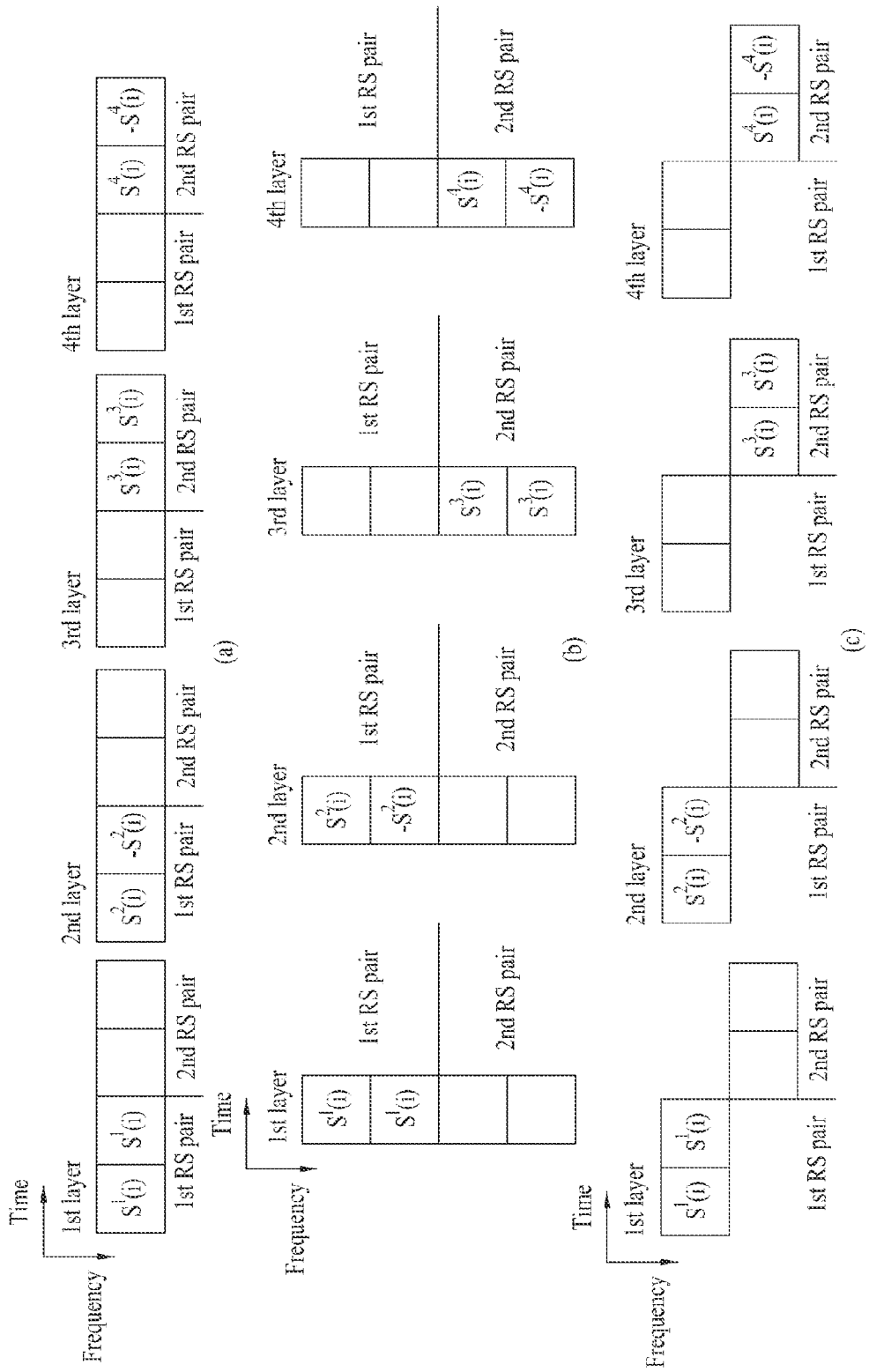

With reference to FIG. 11, a description will now be given of the case in which at least four DRSs are used when DRSs for distinguishing between the channels of four layers are transmitted. Four DRSs includes two DRS pairs, each of which includes two DRSs and may be arranged such that the two DRS pairs are distinguished in the frequency or time domain (i.e. by an FDM or TDM scheme). At this time, one pair may be used to distinguish between two layers using orthogonal codes and another DRS pair may be used to distinguish between another two layers using orthogonal codes. The four DRS positions may be present in four different subcarrier positions on the same OFDM symbol (FIG. 11(a)) and may be present on four different OFDM symbol positions on the same subcarrier (FIG. 11(b)). Alternatively, four DRSs may be present on two different OFDM symbol positions on the same subcarrier and on two different OFDM symbol positions on another subcarrier (FIG. 11(c)). Although FIG. 11 shows that REs on which the DRSs are arranged are contiguous in the time or frequency domain, the present invention is not limited thereto and REs on which the DRSs are arranged need not be contiguous in the time or frequency domain.

For example, two DRS positions of a first DRS pair are used for first and second layers and the first and second layers are distinguished using orthogonal covering (e.g. a Walsh matrix $H_2$ of size 2). In addition, two DRS positions of a second DRS pair are used for third and fourth layers and the third and fourth layers are distinguished using orthogonal covering (e.g. a Walsh matrix $H_2$ of size 2). REs (the first DRS pair) on which DRSs for the first and second layers of FIG. 11 are arranged represent REs of the same position. Moreover, REs (the second DRS pair) on which DRSs for the third and fourth layers of FIG. 11 are arranged represent REs of the same position.

For example, to estimate the channel of the first layer in the first DRS pair, the same sequence $S^1(i)$ is transmitted to two DRSs and a first row (1, 1) of the Walsh matrix $H_2$ is multiplied. That is, $S^1(i)$ and $S^1(i)$ are transmitted to two DRS positions. To estimate the channel of the second layer, the same sequence $S^2(i)$ is transmitted to two DRSs and a second row (1, −1) of the Walsh matrix $H_2$ is multiplied. That is, $S^2(i)$ and $-S^2(i)$ are transmitted to two DRS positions.

Next, to estimate the channel of the third layer in the second DRS pair, the same sequence $S^3(i)$ is transmitted to two DRSs and the first row (1, 1) of the Walsh matrix $H_2$ is multiplied. That is, $S^3(i)$ and $S^3(i)$ are transmitted to two DRS positions. To estimate the channel of the fourth layer, the same sequence $S^4(i)$ is transmitted to two DRSs and the second row (1, −1) of the Walsh matrix $H_2$ is multiplied. That is, $S^4(i)$ and $-S^4(i)$ are transmitted to two DRS positions.

Hereinafter, embodiments for arranging DRSs for multiple layers using the above-described orthogonal covering on REs using a CDM scheme and transmitting the DRSs will be described. The following embodiments will be described based on the DRS pattern shown in FIG. 6. However, the present invention is not limited thereto and methods of the following embodiments will be equally applied to FIG. 16 to FIG. 30 showing various modifications of the DRS pattern shown in FIG. 6.

An embodiment for arranging DRSs on REs by a CDM scheme in rank 2 transmission will now be described with reference to FIG. 12.

In rank 2 transmission, either the above-described DRS group #0 or #1 may be used. For example, when the DRS group #0 is used, DRS positions represented by A and B in FIG. 12 are used. Meanwhile, when DRS group #1 is used, DRS positions represented by C and D in FIG. 12 are used. In the following description, it is assumed that DRS group #0 is used.

Figure 12:
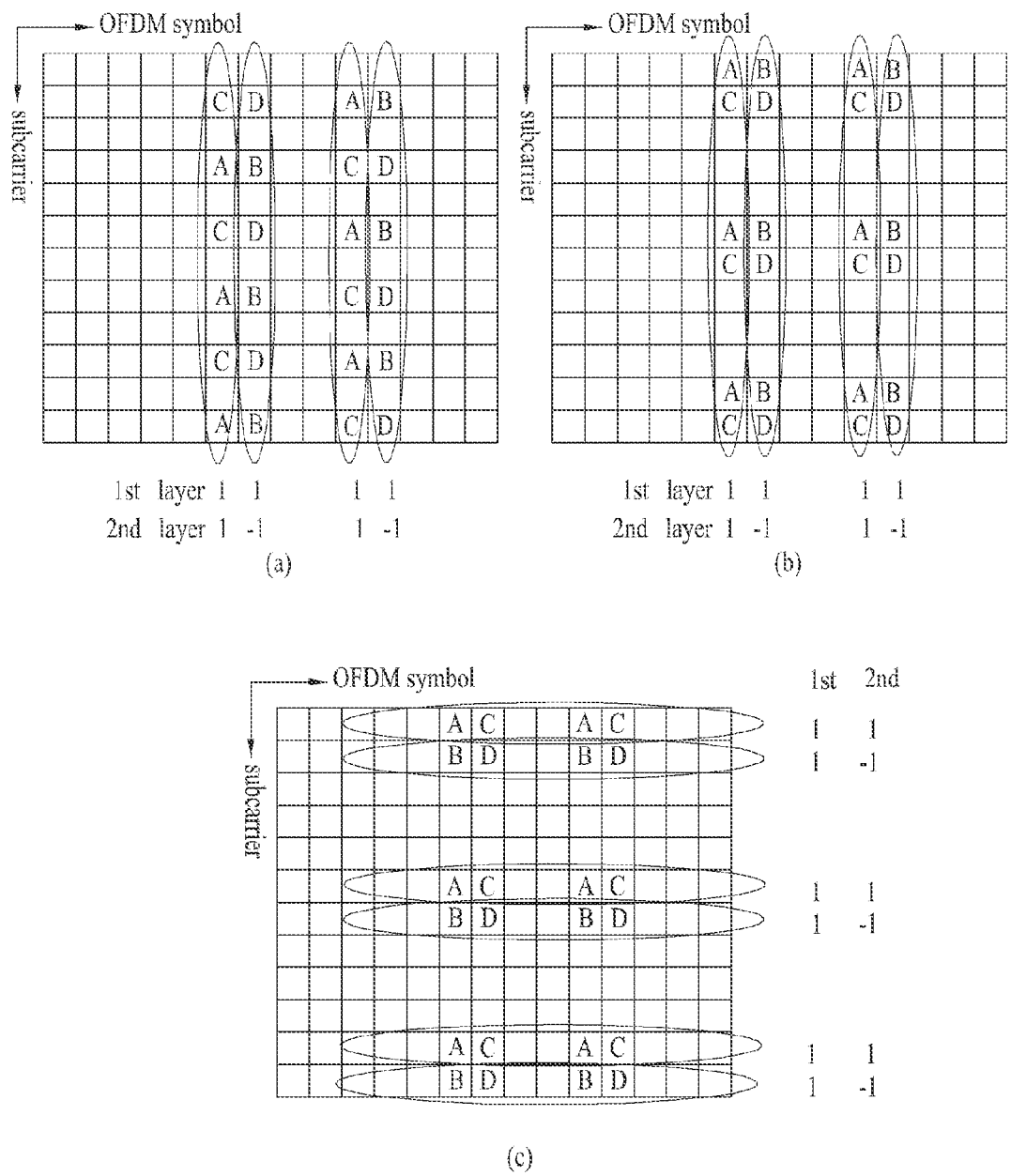

An orthogonal cover used to distinguish between two layers is described in conjunction with FIG. 12.

When DRSs are located on four OFDM symbols as shown in FIG. 12(a) and FIG. 12(b), an orthogonal code of length 4 may be used. If an orthogonal cover matrix of size 2 is used to generate the orthogonal code of length 4, an element of one row or column of that matrix may be cyclically repeated. For example, (1, 1) which is a first row of a Walsh matrix of size 2 may be cyclically repeated so that (1, 1, 1, 1) which is an orthogonal code of length 4 may be multiplied across the four OFDM symbols. Moreover, (1, −1) which is a second row of the Walsh matrix of size 2 may be cyclically repeated so that (1, −1, 1, −1) which is an orthogonal code of length 4 may be multiplied across the four OFDM symbols. Alternatively, one row or column of a Walsh matrix or DFT matrix of size 4 may be used as the orthogonal code of length 4. At this time, two arbitrary rows or columns of the Walsh matrix or DFT matrix of size 4 may be used as an orthogonal code for distinguishing between two layers.

When DRSs are located on 6 subcarriers as shown in FIG. 12(c), an orthogonal code of length 6 may be used. For example, if a Walsh matrix of size 2 is used to generate the orthogonal code of length 6, (1, 1) which is the first row of the Walsh matrix of size 2 may be cyclically repeated so that (1, 1, 1, 1, 1, 1) which is an orthogonal code of length 6 may be multiplied across the 6 subcarriers. Moreover, (1, −1) which is the second row of the Walsh matrix of size 2 may be cyclically repeated so that (1, −1, 1, −1, 1, −1) which is an orthogonal code of length 6 may be multiplied across the 6 subcarriers. Alternatively, one row or column of a DFT matrix of size 3 may be cyclically repeated as the orthogonal code of length 6. At this time, two arbitrary rows or columns of the DFT matrix of size 3 may be used as the orthogonal code for distinguishing between two layers. Alternatively, one row or column of a Walsh matrix or DFT matrix of size 4 may be cyclically repeated as the orthogonal code of length 6. In this case, two arbitrary rows or columns of the Walsh matrix or DFT matrix of size 4 may be used as the orthogonal code for distinguishing between two layers.

An orthogonal cover matrix capable of generating the orthogonal code is not limited to the aforementioned examples. If the length of a multiplied orthogonal code is determined according to a DRS position, a row or column of an orthogonal cover matrix of appropriate size may be directly used as an orthogonal code or an element of a row or column may be cyclically repeated to generate the orthogonal code.

Referring to FIG. 12(a), A and B are located on two different OFDM symbols with respect to each of 6 subcarriers. For example, A and B are respectively located on the 6th and 7th OFDM symbols with respect to each of the 4th, 8th, and 12th subcarriers. In addition, A and B are respectively located on the 10th and 11th OFDM symbols with respect to each of the 2nd, 6th, and 10th subcarriers.

To estimate the channel of a first layer, an orthogonal cover (1, 1, 1, 1) may be multiplied across 4 OFDM symbols (i.e. time domain covering). For example, the orthogonal cover (1, 1, 1, 1) may be multiplied by a sequence $S^1(i)$ of DRS positions represented by A and B on the 6th, 7th, 10th, and 11th OFDM symbols of FIG. 12(a) to transmit $S^1(i)$, $S^1(i)$, $S^1(i)$, and $S^1(i)$.

To estimate the channel of a second layer, an orthogonal cover (1, −1, 1, −1) may be multiplied across 4 OFDM symbols (i.e. time domain covering). For example, the orthogonal cover (1, −1, 1, −1) may be multiplied by a sequence $S^2(i)$ of DRS positions represented by A and B on the 6th, 7th, 10th, and 11th OFDM symbols of FIG. 12(a) to transmit $S^2(i)$, $-S^2(i)$, $S^2(i)$, and $-S^2(i)$. Here, $S^1(i)$ and $S^2(i)$ may be equal or different sequences.

Referring to FIG. 12(b), A and B are located on 4 different OFDM symbols with respect to each of 3 subcarriers. For example, A and B are respectively located on the 6th and 7th OFDM symbols with respect to each of the 1st, 6th, and 11th subcarriers. In addition, A and B are respectively located on the 10th and 11th OFDM symbols with respect to each of the 1st, 6th, and 11th subcarriers.

To estimate the channel of a first layer, an orthogonal cover (1, 1, 1, 1) may be multiplied across 4 OFDM symbols (i.e. time domain covering). For example, the orthogonal cover (1, 1, 1, 1) may be multiplied by a sequence $S^1(i)$ of DRS positions represented by A and B on the 6th, 7th, 10th, and 11th OFDM symbols of FIG. 12(a) to transmit $S^1(i)$, $S^1(i)$, $S^1(i)$, and $S^1(i)$.

To estimate the channel of a second layer, an orthogonal cover (1, −1, 1, −1) may be multiplied across 4 OFDM symbols (i.e. time domain covering). For example, the orthogonal cover (1, −1, 1, −1) may be multiplied by a sequence $S^2(i)$ of DRS positions represented by A and B on the 6th, 7th, 10th, and 11th OFDM symbols of FIG. 12(a) to transmit $S^2(i)$, $-S^2(i)$, $S^2(i)$, and $-S^2(i)$. Here, $S^1(i)$ and $S^2(i)$ may be equal or different sequences.

Referring to FIG. 12(c), A and B are located on 6 different subcarriers with respect to each of 2 OFDM symbols. For example, in the 6th OFDM symbol position, A and B are respectively located on the first and second subcarriers, are respectively located on the 6th and 7th subcarriers, and are respectively located on 11th and 12th subcarriers. In addition, in the 11th OFDM symbol position, A and B are respectively located on the first and second subcarriers, are respectively located on the 6th and 7th subcarriers, and are respectively located on 11th and 12th subcarriers.

To estimate the channel of a first layer, an orthogonal cover (1, 1, 1, 1, 1, 1) may be multiplied across 6 subcarriers (i.e. frequency domain covering). For example, the orthogonal cover (1, 1, 1, 1, 1, 1) may be multiplied by a sequence $S^1(i)$ of DRS positions represented by A and B on the 1st, 2nd, 6th, 7th, 11th, and 12th subcarriers of FIG. 12(a) to transmit $S^1(i)$, $S^1(i)$, $S^1(i)$, $S^1(i)$, $S^1(i)$, and $S^1(i)$.

To estimate the channel of a second layer, an orthogonal cover (1, −1, 1, −1, 1, −1) may be multiplied across 6 subcarriers (i.e. frequency domain covering). For example, the orthogonal cover (1, −1, 1, −1, 1, −1) may be multiplied by a sequence $S^2(i)$ of DRS positions represented by A and B on the 1st, 2nd, 6th, 7th, 11th, and 12th subcarriers of FIG. 12(a) to transmit $S^2(i)$, $-S^2(i)$, $S^2(i)$, $-S^2(i)$, $S^2(i)$, and $-S^2(i)$. Here, $S^1(i)$ and $S^2(i)$ may be equal or different sequences.

Although time domain covering has mainly been described with respect to FIG. 12(a) and FIG. 12(b), frequency domain covering may be applied to the same DRS pattern by the method as described with reference to FIG. 12(c). In more detail, DRSs for two layers may be distinguished by multiplying two orthogonal codes of length 3 across three subcarriers. Similarly, although frequency domain covering has mainly been described with respect to FIG. 12(c), time domain covering may be applied to the same DRS pattern by the method as described with reference to FIG. 12(a) and FIG. 12(b). In more detail, DRSs for two layers may be distinguished by multiplying two orthogonal codes of length 2.

An embodiment for arranging DRSs on REs by a CDM scheme in rank 3 transmission will now be described with reference to FIG. 13.

In rank 3 transmission, either the above-described DRS group #0 or #1 may be used. For example, when the DRS group #0 is used, DRS positions represented by A and B in FIG. 13 are used. Meanwhile, when the DRS group #1 is used, DRS positions represented by C and D in FIG. 13 are used. In the following description, it is assumed that the DRS group #0 is used.

Figure 13:
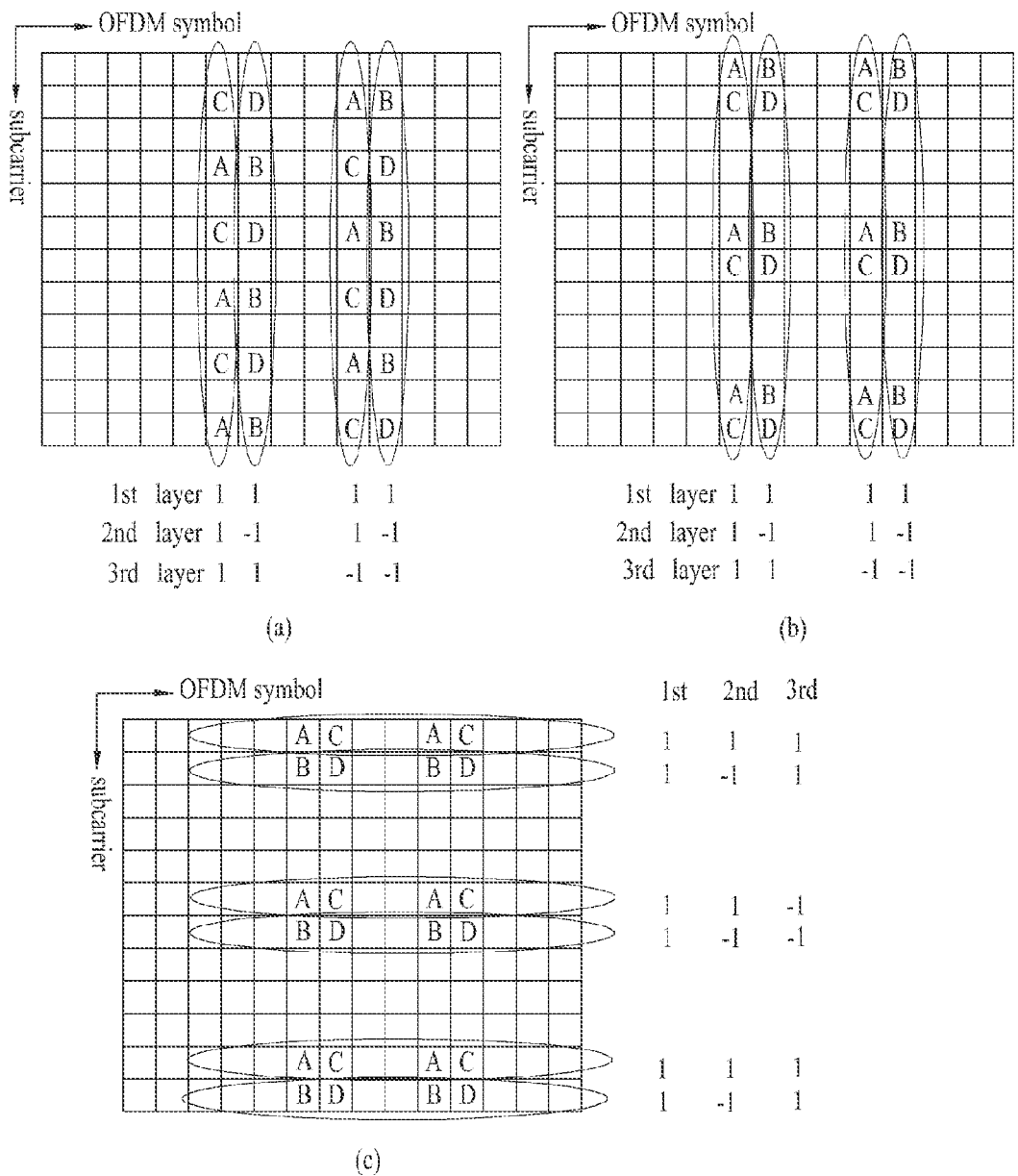

An orthogonal cover used to distinguish between three layers is described in conjunction with FIG. 13.

When DRSs are located on four different OFDM symbols as shown in FIG. 13(a) and FIG. 13(b), an orthogonal code of length 4 may be used. If a DFT matrix of size 3 is used to generate the orthogonal code of length 4, an element of one row or column of the DFT matrix of size 3 may be cyclically repeated. For example, (1, 1, 1) which is a first row of the DFT matrix of size 3 may be cyclically repeated so that (1, 1, 1, 1) which is an orthogonal code of length 4 may be multiplied across the four OFDM symbols. Moreover, $(1, e^{j(2\pi/3)}, e^{j(4\pi/3)})$ which is a second row of the DFT matrix of size 3 may be cyclically repeated so that $(1, e^{j(2j/3)}, e^{j(4\pi/3)}, 1)$ which is an orthogonal code of length 4 may be multiplied across the four OFDM symbols. Moreover, $(1, e^{j(4\pi/3)}, e^{j(8\pi/3)})$ which is a third row of the DFT matrix of size 3 may be cyclically repeated so that $(1, e^{j(4\pi/3)}, e^{j(8\pi/3)}, 1)$, which is an orthogonal code of length 4 may be multiplied across the four OFDM symbols. Alternatively, one row or column of a Walsh matrix or DFT matrix of size 4 may be used as the orthogonal code of length 4. At this time, three arbitrary rows or columns of the Walsh matrix or DFT matrix of size 4 may be used as an orthogonal code for distinguishing between three layers.

When DRSs are located on 6 subcarriers as shown in FIG. 13(c), an orthogonal code of length 6 may be used. If the DFT matrix of size 3 is used to generate the orthogonal code of length 6, (1, 1, 1) which is the first row of the DFT matrix of size 3 may be cyclically repeated so that (1, 1, 1, 1, 1, 1) which is an orthogonal code of length 6 may be multiplied across the 6 subcarriers. Moreover, $(1, e^{j(2\pi/3)}, e^{j(4\pi/3)})$ which is the second row of the DFT matrix of size 3 may be cyclically repeated so that $(1, e^{j(2\pi/3)}, e^{j(4\pi/3)}, 1, e^{j(2\pi/3)}, e^{j(4\pi/3)})$ which is an orthogonal code of length 6 may be multiplied across the 6 subcarriers. In addition, $(1, e^{j(4\pi/3)}, e^{j(8\pi/3)})$ which is the third row of the DFT matrix of size 3 may be cyclically repeated so that $(1, e^{j(4\pi/3)}, e^{j(8\pi/3)}, 1, e^{j(4\pi/3)}, e^{j(8\pi/3)})$ which is an orthogonal code of length 6 may be multiplied across the 6 subcarriers. Alternatively, one row or column of a Walsh matrix or DFT matrix of size 4 may be cyclically repeated as the orthogonal code of length 6. At this time, three arbitrary rows or columns of the Walsh matrix or DFT matrix of size 4 may be used as an orthogonal code for distinguishing between three layers.

An orthogonal cover matrix capable of generating the orthogonal code is not limited to the aforementioned examples. If the length of a multiplied orthogonal code is determined according to a DRS position, a row or column of an orthogonal cover matrix of an appropriate size may be directly used as an orthogonal code or an element of a row or column may be cyclically repeated to generate the orthogonal code.

The following embodiment describes an example of distinguishing between three layers using an orthogonal code generated from a Walsh matrix of length 4.

Referring to FIG. 13(a), A and B are located on two different OFDM symbols with respect to each of 6 subcarriers. For example, A and B are respectively located on the 6th and 7th OFDM symbols with respect to each of the 4th, 8th, and 12th subcarriers. In addition, A and B are respectively located on the 10th and 11th OFDM symbols with respect to each of the 2nd, 6th, and 10th subcarriers.

Referring to FIG. 13(b), A and B are located on 4 different OFDM symbols with respect to each of 3 subcarriers. For example, A and B are respectively located on the 6th and 7th OFDM symbols with respect to each of the 1st, 6th, and 11th subcarriers. In addition, A and B are respectively located on the 10th and 11th OFDM symbols with respect to each of the 1st, 6th, and 11th subcarriers.

With respect to each of DRS patterns shown in FIG. 13(a) and FIG. 13(b), an orthogonal cover (1, 1, 1, 1) may be multiplied across 4 OFDM symbols to estimate the channel of a first layer. An orthogonal cover (1, -1, 1, -1) may be multiplied across 4 OFDM symbols to estimate the channel of a second layer. An orthogonal cover (1, 1, -1, -1) may be multiplied across 4 OFDM symbols to estimate the channel of a third layer. Namely, a DRS sequence is covered in the time domain by an orthogonal code.

For example, in DRS positions represented by A and B on the 6th, 7th, 10th, and 11th OFDM symbols of FIG. 13(a) or FIG. 13(b), the orthogonal cover (1, 1, 1, 1) may be multiplied by a sequence $S^1(i)$ for the first layer to transmit $S^1(i)$, $S^1(i)$, $S^1(i)$, and S'(i), the orthogonal cover (1, -1, 1, -1) may be multiplied by a sequence $S^2(i)$ for the second layer to transmit $S^2(i)$, $-S^2(i)$, $S^2(i)$, and $-S^2(i)$, and the orthogonal cover (1, 1, -1, -1) may be multiplied by a sequence $S^3(i)$ for the third layer to transmit $S^3(i)$, $S^3(i)$, $-S^3(i)$, and $-S^3(i)$. Here, $S^1(i)$, $S^2(i)$, and $S^3(i)$ may be equal or different sequences.

Referring to FIG. 13(c), A and B are located on 6 different subcarriers with respect to each of 2 OFDM symbols. For example, in the 6th OFDM symbol position, A and B are respectively located on the first and second subcarriers, are respectively located on the 6th and 7th subcarriers, and are respectively located on the 11th and 12th subcarriers. In addition, in the 11th OFDM symbol position, A and B are respectively located on the first and second subcarriers, are respectively located on the 6th and 7th subcarriers, and are respectively located on 11th and 12th subcarriers.

To estimate the channel of a first layer, an orthogonal cover (1, 1, 1, 1, 1, 1) may be multiplied across 6 subcarriers. To estimate the channel of a second layer, an orthogonal cover (1, -1, 1, -1, 1, -1) may be multiplied across 6 subcarriers. To estimate the channel of a third layer, an orthogonal cover (1, 1, -1, -1, 1, 1) may be multiplied across 6 subcarriers. Namely, a DRS sequence is covered in the frequency domain by an orthogonal code.

For example, in DRS positions represented by A and B on the 1st, 2nd, 6th, 7th, 11th, and 12th subcarriers of FIG. 13(c), the orthogonal cover (1, 1, 1, 1, 1, 1) may be multiplied by a sequence $S^1(i)$ for the first layer to transmit $S^1(i)$, $S^1(i)$, $S^1(i)$, $S^1(i)$, $S^1(i)$, and $S^1(i)$, the orthogonal cover (1, -1, 1, ÷1, 1, -1) may be multiplied by a sequence $S^2(i)$ for the second layer to transmit $S^2(i)$, $-S^2(i)$, $S^2(i)$, $-S^2(i)$, $S^2(i)$, and $-S^2(i)$, and the orthogonal cover (1, 1, -1, -1, 1, 1) may be multiplied by a sequence $S^3(i)$ for the third layer to transmit $S^3(i)$, $S^3(i)$, $-S^3(i)$, $-S^3(i)$, $S^3(i)$, and $S^3(i)$. Here, $S^1(i)$, $S^2(i)$, and $S^3(i)$ may be equal or different sequences.

Although time domain covering has mainly been described with respect to FIG. 13(a) and FIG. 13(b), frequency domain covering may be applied to the same DRS pattern by the method as described with reference to FIG. 13(c). In more detail, DRSs for three layers may be distinguished by multiplying three orthogonal codes of length 3 across three subcarriers. Similarly, although frequency domain covering has mainly been described with respect to FIG. 13(c), time domain covering may be applied to the same DRS pattern by the method as described with reference to FIG. 13(a) and FIG. 13(b). In this case, a mixture of a CDM scheme and an FDM scheme may be applied. For example, DRSs for the first and second layers may be distinguished by multiplying two orthogonal codes of length 2 in the DRS position represented by A, and a DRS for the third layer may be distinguished using the DRS represented by B. The first and second layers and the third layer may be distinguished by the FDM scheme by different subcarrier positions of A and B, and the first and second layers may be distinguished by a CDM scheme in the position represented by A.

An embodiment for arranging DRSs on REs by a CDM scheme in rank 4 transmission will now be described with reference to FIG. 14.

In rank 4 transmission, either the above-described DRS group #0 or #1 may be used. For example, when the DRS group #0 is used, DRS positions represented by A and B in FIG. 14 are used. Meanwhile, when DRS group #1 is used, DRS positions represented by C and D in FIG. 14 are used. In the following description, it is assumed that DRS group #0 is used.

An orthogonal cover used to distinguish between four layers is described in conjunction with FIG. 14.

When DRSs are located on four different OFDM symbols as shown in FIG. 14(a) and FIG. 14(b), an orthogonal code of length 4 may be used. To generate the orthogonal code of length 4, a Walsh matrix or DFT matrix of length 4 may be used.

When DRSs are located on 6 subcarriers as shown in FIG. 14(c), an orthogonal code of length 6 may be used. To generate an orthogonal code of length 4, a Walsh matrix or DFT matrix of length 4 may be used. For example, if the Walsh matrix of size 4 is used to generate the orthogonal code of length 6, (1, 1, 1, 1) which is a first row of the Walsh matrix of size 4 may be cyclically repeated so that (1, 1, 1, 1, 1, 1) which is an orthogonal code of length 6 may be multiplied across the 6 subcarriers. Moreover, (1, −1, 1, −1) which is a second row of the Walsh matrix of size 4 may be cyclically repeated so that (1, −1, 1, −1, 1, −1) which is an orthogonal code of length 6 may be multiplied across the 6 subcarriers. In addition, (1, 1, −1, −1) which is a third row of the Walsh matrix of size 4 may be cyclically repeated so that (1, 1, −1, −1, 1, 1) which is an orthogonal code of length 6 may be multiplied across the 6 subcarriers. Moreover, (1, −1, −1, 1) which is a fourth row of the Walsh matrix of size 4 may be cyclically repeated so that (1, −1, −1, 1, 1, −1) which is an orthogonal code of length 6 may be multiplied across the 6 subcarriers.

An orthogonal cover matrix capable of generating the orthogonal code is not limited to the aforementioned example. If the length of a multiplied orthogonal code is determined according to a DRS position, a row or column of an orthogonal cover matrix of an appropriate size may be directly used as an orthogonal code or an element of a row or column may be cyclically repeated to generate the orthogonal code.

The following embodiment describes an example of distinguishing between four layers using an orthogonal code generated from a Walsh matrix of length 4.

Referring to FIG. 14(a), A and B are located on two different OFDM symbols with respect to each of 6 subcarriers. In more detail, A and B are respectively located on the 6th and 7th OFDM symbols with respect to each of the 4th, 8th, and 12th subcarriers. In addition, A and B are respectively located on the 10th and 11th OFDM symbols with respect to each of the 2nd, 6th, and 10th subcarriers.

Referring to FIG. 14(b), A and B are located on 4 different OFDM symbols with respect to each of 3 subcarriers. For example, A and B are respectively located on the 6th and 7th OFDM symbols with respect to each of the 1st, 6th, and 11th subcarriers. In addition, A and B are respectively located on the 10th and 11th OFDM symbols with respect to each of the 1st, 6th, and 11th subcarriers.

With respect to DRS patterns shown in FIG. 14(a) and FIG. 14(b), an orthogonal cover (1, 1, 1, 1) may be multiplied across 4 OFDM symbols to estimate the channel of a first layer. An orthogonal cover (1, −1, 1, −1) may be multiplied across 4 OFDM symbols to estimate the channel of a second layer. An orthogonal cover (1, 1, −1, −1) may be multiplied across 4 OFDM symbols to estimate the channel of a third layer. An orthogonal cover (1, −1, −1, 1) may be multiplied across 4 OFDM symbols to estimate the channel of a fourth layer. Namely, a DRS sequence is covered in the time domain by an orthogonal code.

For example, in DRS positions represented by A and B on the 6th, 7th, 10th, and 11th OFDM symbols of FIG. 14(a) or FIG. 14(b), the orthogonal cover (1, 1, 1, 1) may be multiplied by a sequence $S^1(i)$ for the first layer to transmit $S^1(i)$, $S^1(i)$, $S^1(i)$, and $S^1(i)$, the orthogonal cover (1, −1, 1, −1) may be multiplied by a sequence $S^2(i)$ for the second layer to transmit $S^2(i)$, $-S^2(i)$, $S^2(i)$, and $-S^2(i)$, the orthogonal cover (1, 1, −1, −1) may be multiplied by a sequence $S^3(i)$ for the third layer to transmit $S^3(i)$, $S^3(i)$, $-S^3(i)$, and $-S^3(i)$, and the orthogonal cover (1, −1, −1, 1) may be multiplied by a sequence $S^4(i)$ for the fourth layer to transmit $S^4(i)$, $-S^4(i)$, $-S^4(i)$, and $S^4(i)$. Here, $S^1(i)$, $S^2(i)$, $S^3(i)$, and $S^4(i)$ may be equal or different sequences.

Referring to FIG. 14(c), A and B are located on 6 different subcarriers with respect to each of 2 OFDM symbols. For example, in the 6th OFDM symbol position, A and B are respectively located on the first and second subcarriers, are respectively located on the 6th and 7th subcarriers, and are respectively located on the 11th and 12th subcarriers. In addition, in the 11th OFDM symbol position, A and B are respectively located on the first and second subcarriers, are respectively located on the 6th and 7th subcarriers, and are respectively located on 11th and 12th subcarriers.

To estimate the channel of a first layer, an orthogonal cover (1, 1, 1, 1, 1, 1) may be multiplied across 6 subcarriers. To estimate the channel of a second layer, an orthogonal cover (1, −1, 1, −1, 1, −1) may be multiplied across 6 subcarriers. To estimate the channel of a third layer, an orthogonal cover (1, 1, −1, −1, 1, 1) may be multiplied across 6 subcarriers. To estimate the channel of a fourth layer, an orthogonal cover (1, −1, −1, 1, 1, −1) may be multiplied across 6 subcarriers. Namely, a DRS sequence is covered in the frequency domain by an orthogonal code.

For example, in DRS positions represented by A and B on the 1st, 2nd, 6th, 7th, 11th, and 12th subcarriers of FIG. 14(c), the orthogonal cover (1, 1, 1, 1, 1, 1) may be multiplied by a sequence $S^1(i)$ for the first layer to transmit $S^1(i)$, $S^1(i)$, $S^1(i)$, $S^1(i)$, $S^1(i)$, and $S^1(i)$, the orthogonal cover (1, −1, 1, −1, 1, −1) may be multiplied by a sequence $S^2(i)$ for the second layer to transmit $S^2(i)$, $-S^2(i)$, $S^2(i)$, $-S^2(i)$, $S^2(i)$, and $-S^2(i)$, the orthogonal cover (1, 1, −1, −1, 1, 1) may be multiplied by a sequence $S^3(i)$ for the third layer to transmit $S^3(i)$, $S^3(i)$, $-S^3(i)$, $-S^3(i)$, $S^3(i)$, and $S^3(i)$, and the orthogonal cover (1, −1, −1, 1, 1, −1) may be multiplied by a sequence $S^4(i)$ for the fourth layer to transmit $S^4(i)$, $-S^4(i)$, $-S^4(i)$, $S^4(i)$, $S^4(i)$, and $-S^4(i)$. Here, $S^1(i)$, $S^2(i)$, $S^3(i)$, and $S^4(i)$ may be equal or different sequences.

Although time domain covering has mainly been described with respect to FIG. 14(a) and FIG. 14(b), frequency domain covering may be applied to the same DRS pattern by the method as described with reference to FIG. 14(c). In more detail, DRSs for four layers may be distinguished by multiplying four orthogonal codes of length 3 across three subcarriers. The orthogonal code of length 3 may also be generated from an orthogonal cover matrix of size 2 using a cyclic repetition scheme. Similarly, although frequency domain covering has mainly been described with respect to FIG. 14(c), time domain covering may be applied to the same DRS pattern by the method as described with reference to FIG. 14(a) and FIG. 14(b). In this case, a mixture of a CDM scheme and an FDM scheme may be applied. For example, DRSs for the first and second layers may be distinguished by multiplying two orthogonal codes of length 2 in the DRS position represented by A, and DRSs for the third and fourth layers may be distinguished by multiplying two orthogonal codes of length 2 in the DRS position presented by B.

Another embodiment for arranging DRSs on REs by a CDM scheme in rank 4 transmission will now be described with reference to FIG. 15. In the present embodiment, it is assumed that the DRS group #0 (A and B) is used as in the description of FIG. 14.

In FIG. 15, the case in which an orthogonal cover matrix of size 2 (e.g. a Walsh matrix of length 2) is used to distinguish between four layers will be described.

When DRSs are located on four OFDM symbols as shown in FIG. 15(a) and FIG. 15(b), two layers may be distinguished through DRSs located on two OFDM symbols and the other two layers may be distinguished through DRSs located on the other two OFDM symbols. For example, in FIG. 15(a) and FIG. 15(b), two layers may be distinguished using an orthogonal code of length 2 over two OFDM symbols on which A is arranged and the other two layers may be distinguished using an orthogonal code of length 2 over two OFDM symbols on which B is arranged. Alternatively, two layers may be distinguished using an orthogonal code of length 2 over one OFDM symbol on which A is arranged and over one OFDM symbol on which B is arranged, and the other two layers may be distinguished using an orthogonal code of length 2 over the other one OFDM symbol on which A is arranged and over the other one OFDM symbol on which B is arranged.

Among the four layers, since two layers (a first layer group) and the other two layers (a second layer group) are distinguished using a DRS pattern on different OFDM symbols, the layer groups are multiplexed using a TDM scheme. In addition, two layers within one layer group use the same DRS pattern but are multiplexed by a CDM scheme using an orthogonal code. Namely, the embodiment of FIG. 15(a) and FIG. 15(b) relates to a method for distinguishing between four layers using an orthogonal cover matrix of size 2 by simultaneously applying the TDM scheme and the CDM scheme.

When DRSs are located on 6 subcarriers as shown in FIG. 15(c), A is located on three subcarriers and B is located on three different subcarriers. In this case, two layers may be distinguished using an orthogonal code of length 3 over three subcarriers on which A is arranged, and the other two layers may be distinguished using an orthogonal code of length 3 over three subcarriers on which B is arranged. The orthogonal code of length 3 may be generated by cyclically repeating an element of one row or column of a Walsh matrix of size 2.

Among the four layers, since two layers (a first layer group) and the other two layers (a second layer group) are distinguished using a DRS pattern on different subcarriers, the layer groups are multiplexed using an FDM scheme. In addition, two layers within one layer group use the same DRS pattern but are multiplexed by a CDM scheme using an orthogonal code. Namely, the embodiment of FIG. 15(c) relates to a method for distinguishing between four layers using an orthogonal cover matrix of size 2 by simultaneously applying the FDM scheme and the CDM scheme.

The following embodiment describes an example of distinguishing between four layers using an orthogonal code generated from a Walsh matrix of length 2.

Referring to FIG. 15(a), A and B are located on two different OFDM symbols with respect to each of 6 subcarriers. More specifically, A is located on the 4th, 8th, 12th subcarriers on the 6th OFDM symbol and located on the 2nd, 6th, and 10th subcarriers on the 10th OFDM symbol. B is located on the 4th, 8th, 12th subcarriers on the 7th OFDM symbol and located on the 2nd, 6th, and 10th subcarriers on the 11th OFDM symbol.

Referring to FIG. 15(b), A and B are located on four different OFDM symbols with respect to each of 3 subcarriers. More specifically, A is located on the 1st, 6th, 11th subcarriers with respect to each of the 6th and 10th OFDM symbols. B is located on the 1st, 6th, 11th subcarriers with respect to each of the 7th and 11th OFDM symbols.

With respect to DRS patterns shown in FIG. 15(a) and FIG. 15(b), an orthogonal cover (1, 1) may be multiplied in DRS positions represented by A across 2 OFDM symbols to estimate the channel of a first layer. An orthogonal cover (1, −1) may be multiplied in DRS positions represented by A across 2 OFDM symbols to estimate the channel of a second layer. An orthogonal cover (1, 1) may be multiplied in DRS positions represented by B across 2 OFDM symbols to estimate the channel of a third layer. An orthogonal cover (1, −1) may be multiplied in DRS positions represented by B across 2 OFDM symbols to estimate the channel of a fourth layer. Namely, a DRS sequence is covered in the time domain by an orthogonal code.

For example, in DRS positions represented by A on the 6th and 10th OFDM symbols of FIG. 15(a) or FIG. 15(b), the orthogonal cover (1, 1) may be multiplied by a sequence $S^1(i)$ for the first layer to transmit $S^1(i)$ and $S^1(i)$, and the orthogonal cover (1, −1) may be multiplied by a sequence $S^2(i)$ for the second layer to transmit $S^2(i)$ and $-S^2(i)$. In addition, in DRS positions represented by B on the 7th and 11th OFDM symbols of FIG. 15(a) or FIG. 15(b), the orthogonal cover (1, 1) may be multiplied by a sequence $S^3(i)$ for the third layer to transmit $S^3(i)$ and $S^3(i)$, and the orthogonal cover (1, −1) may be multiplied by a sequence $S^4(i)$ for the fourth layer to transmit $S^4(i)$ and $-S^4(i)$. Here, $S^1(i)$, $S^2(i)$, $S^3(i)$, and $S^4(i)$ may be equal or different sequences.

Alternatively, with respect to DRS patterns shown in FIG. 15(a) and FIG. 15(b), orthogonal covers (1, 1) and (1, −1) may be multiplied in DRS positions represented by A and B across one OFDM symbol on which A is arranged and across one OFDM symbol on which B is arranged to estimate the channels of first and second layers. To estimate the channels of third and fourth layers, orthogonal covers (1, 1) and (1, −1) may be multiplied in DRS positions represented by A and B across another OFDM symbol on which A is arranged and across another OFDM symbol on which B is arranged. Namely, a DRS sequence is covered in the time domain by an orthogonal code.

For example, in DRS positions represented by A and B on the 6th and 7th OFDM symbols of FIG. 15(a) or FIG. 15(b), the orthogonal cover (1, 1) may be multiplied by a sequence $S^1(i)$ for the first layer to transmit $S^1(i)$ and $S^1(i)$, and the orthogonal cover (1, −1) may be multiplied by a sequence $S^2(i)$ for the second layer to transmit $S^2(i)$ and $-S^2(i)$. In addition, in DRS positions represented by A and B on the 10th and 11th OFDM symbols of FIG. 15(a) or FIG. 15(b), the orthogonal cover (1, 1) may be multiplied by a sequence $S^3(i)$ for the third layer to transmit $S^3(i)$ and $S^3(i)$, and the orthogonal cover (1, −1) may be multiplied by a sequence $S^4(i)$ for the fourth layer to transmit $S^4(i)$ and $-S^4(i)$. Here, $S^1(i)$, $S^2(i)$, $S^3(i)$, and $S^4(i)$ may be equal or different sequences.

Referring to FIG. 15(c), A and B are located on 6 different subcarriers with respect to each of 2 OFDM symbols. For example, in each of the 6th and 11th OFDM symbol positions, A is located on the 1st, 6th, and 11th subcarriers and B is located on 2nd, 7th, and 12th subcarriers.

To estimate the channel of a first layer, an orthogonal cover (1, 1, 1) may be multiplied across 3 subcarriers represented by A. To estimate the channel of a second layer, an orthogonal cover (1, −1, 1) may be multiplied across 3 subcarriers represented by A. To estimate the channel of a third layer, an orthogonal cover (1, 1, 1) may be multiplied across 3 subcarriers represented by B. To estimate the channel of a fourth layer, an orthogonal cover (1, −1, 1) may be multiplied across 3 subcarriers represented by B. Namely, a DRS sequence is covered in the frequency domain by an orthogonal code.

For example, in DRS positions represented by A on the 1st, 6th, and 11th subcarriers of FIG. 15(c), the orthogonal cover (1, 1, 1) may be multiplied by a sequence $S^1(i)$ for the first layer to transmit $S^1(i)$, $S^1(i)$, and $S^1(i)$, and the orthogonal cover (1, −1, 1) may be multiplied by a sequence $S^2(i)$ for the second layer to transmit $S^2(i)$, $-S^2(i)$, and $-S^2(i)$. In addition, in DRS positions represented by B on the 2nd, 7th, and 12th subcarriers of FIG. 15(c), the orthogonal cover (1, 1, 1) may be multiplied by a sequence $S^3(i)$ for the third layer to transmit $S^3(i)$, $S^3(i)$, and $S^3(i)$, and the orthogonal cover (1, −1, 1) may be multiplied by a sequence $S^4(i)$ for the fourth layer to transmit $S^4(i)$, $-S^4(i)$, and $S^4(i)$.

Although time domain covering has mainly been described with respect to FIG. 15(a) and FIG. 15(b), frequency domain covering may be applied to the same DRS pattern by the method as described with reference to FIG. 15(c). In more detail, first and second layer groups are distinguished by a TDM scheme, and DRSs for two layers of each layer group may be distinguished using two orthogonal codes of length 3 across three subcarriers. Similarly, although frequency domain covering has mainly been described with respect to FIG. 15(c), time domain covering may be applied to the same DRS pattern by the method as described with reference to FIG. 15(a) and FIG. 15(b). Namely, the first and second layer groups are distinguished by an FDM scheme, and two layers of each layer group may be distinguished using two orthogonal codes of length 2 across two OFDM symbols.

The present invention has described multiplexing of multiple layers using time, frequency, and/or code resources for up to rank 4 transmission.

In rank 5 to rank 8 transmission, DRSs for multiple layers may be multiplexed by a combination of the above various embodiments for rank 2 to rank 4 transmission. That is, in rank 5 to rank 8 transmission, both the DRS group #0 (e.g. DRS positions represented by A and B) and the DRS group #1 (e.g. DRS positions represented by C and D) may be used. The above-described various embodiments of the present invention for the DRS group #0 (A and B) may be equally applied to the DRS group #1 (C and D). Accordingly, a repetitive part of the above description of the present invention will be omitted for clarity.

In rank 5 to rank 8, a number of layers as equal as possible may be distinguished in the DRS groups #0 and #1.

In rank 5 transmission, two layers may be distinguished by TDM, FDM, and/or CDM schemes using one DRS group, and three layers may be distinguished by TDM, FDM, and/or CDM schemes using the other DRS group. For example, DRS group #0 (e.g. A and B) and DRS group #1 (e.g. C and D) are distinguished using different time resources and frequency resources. For DRS group #0 (e.g. A and B), first and second layers may be distinguished by methods such as the embodiments of FIG. 12, and for DRS group #1 (e.g. C and D), third, fourth, and fifth layers may be distinguished by methods such as the embodiments of FIG. 13.

In rank 6 transmission, three layers may be distinguished by TDM, FDM, and/or CDM schemes using one DRS group, and three layers may be distinguished by TDM, FDM, and/or CDM schemes using the other DRS group.

In rank 7 transmission, three layers may be distinguished by TDM, FDM, and/or CDM schemes using one DRS group, and four layers may be distinguished by TDM, FDM, and/or CDM schemes using the other DRS group.

In rank 8 transmission, four layers may be distinguished by TDM, FDM, and/or CDM schemes using one DRS group, and four layers may be distinguished by TDM, FDM, and/or CDM schemes using the other DRS group.

Figure 16:
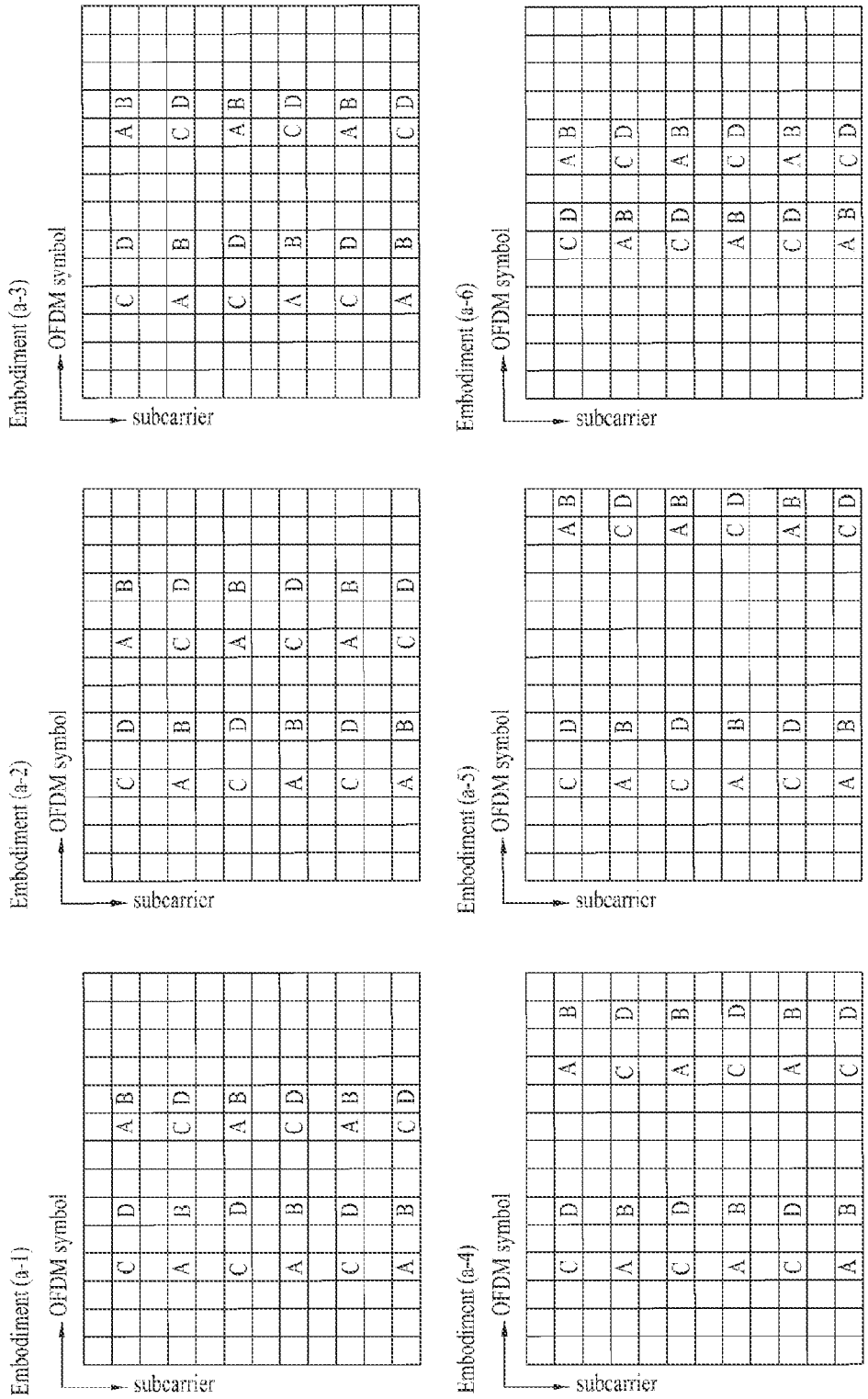
FIG. 16 to FIG. 30 are diagrams showing various modified examples of a DRS pattern which are applicable to the present invention.
Figure 17:
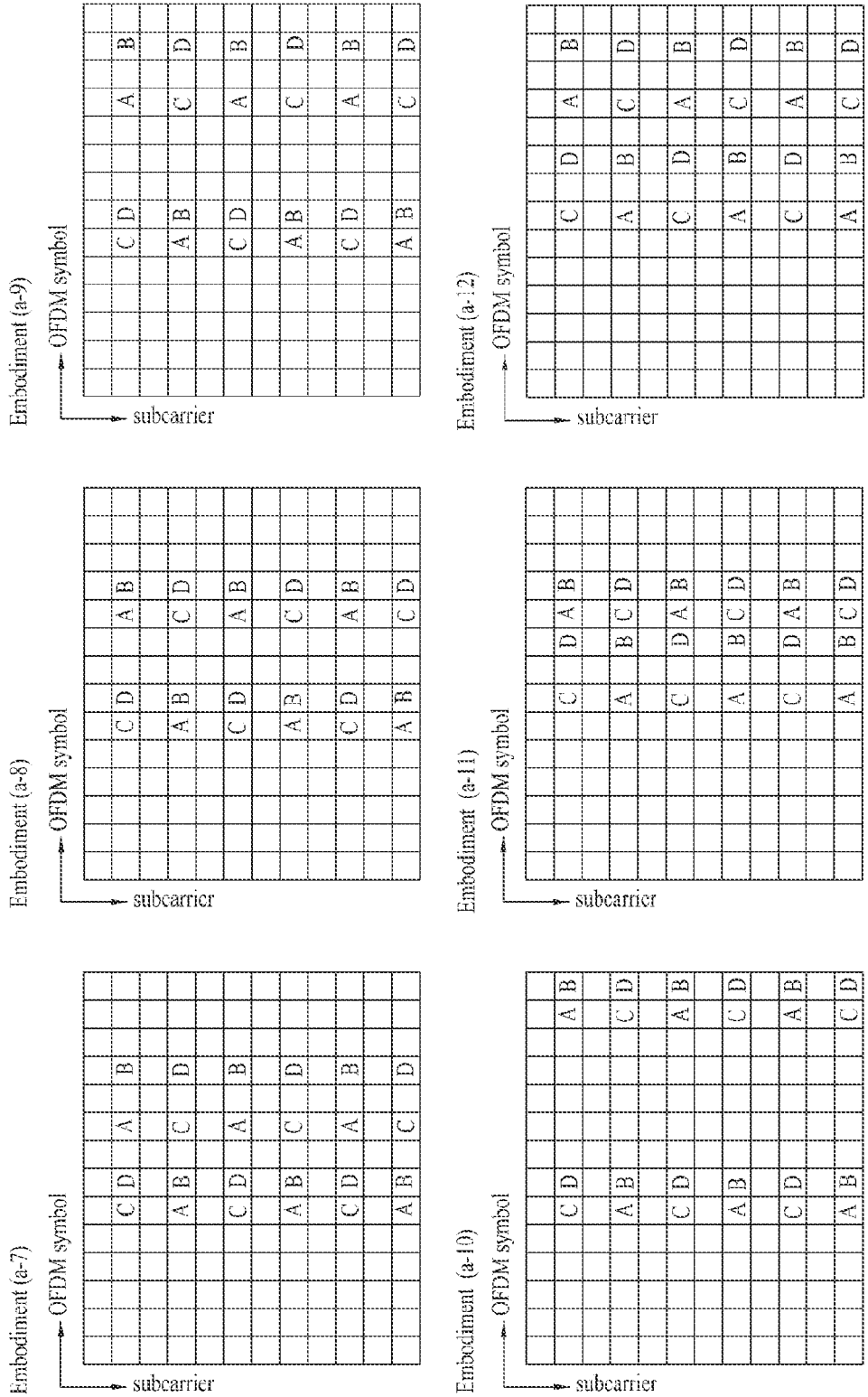
Figure 18:
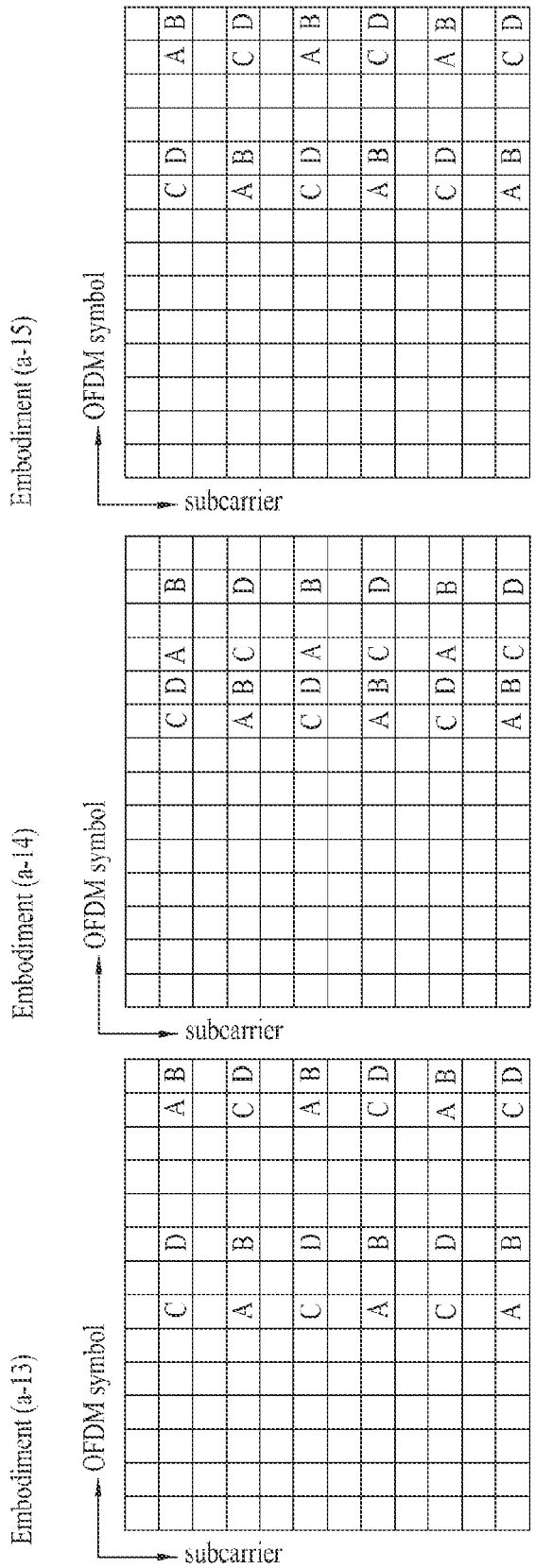
Figure 19:
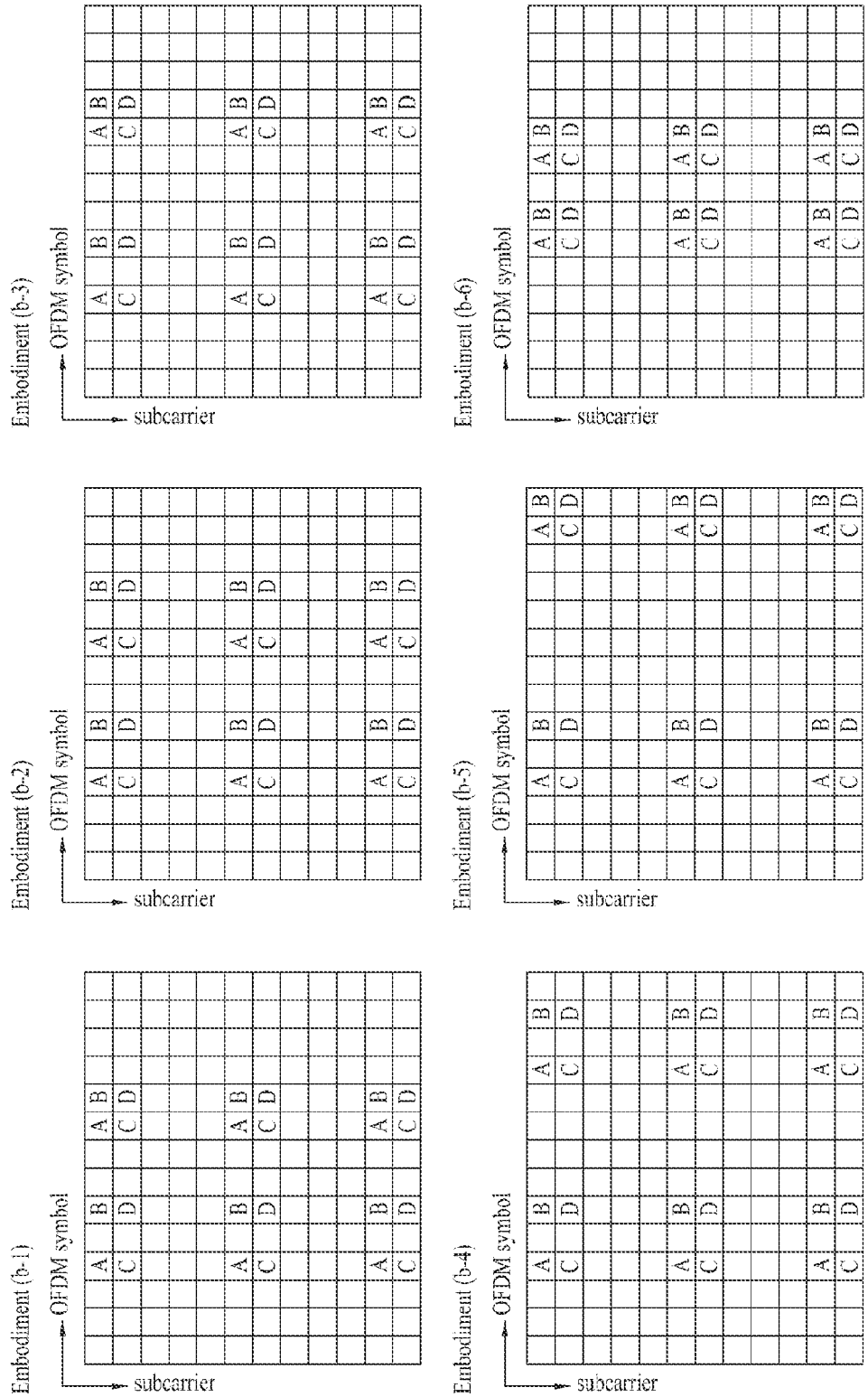
Figure 20:
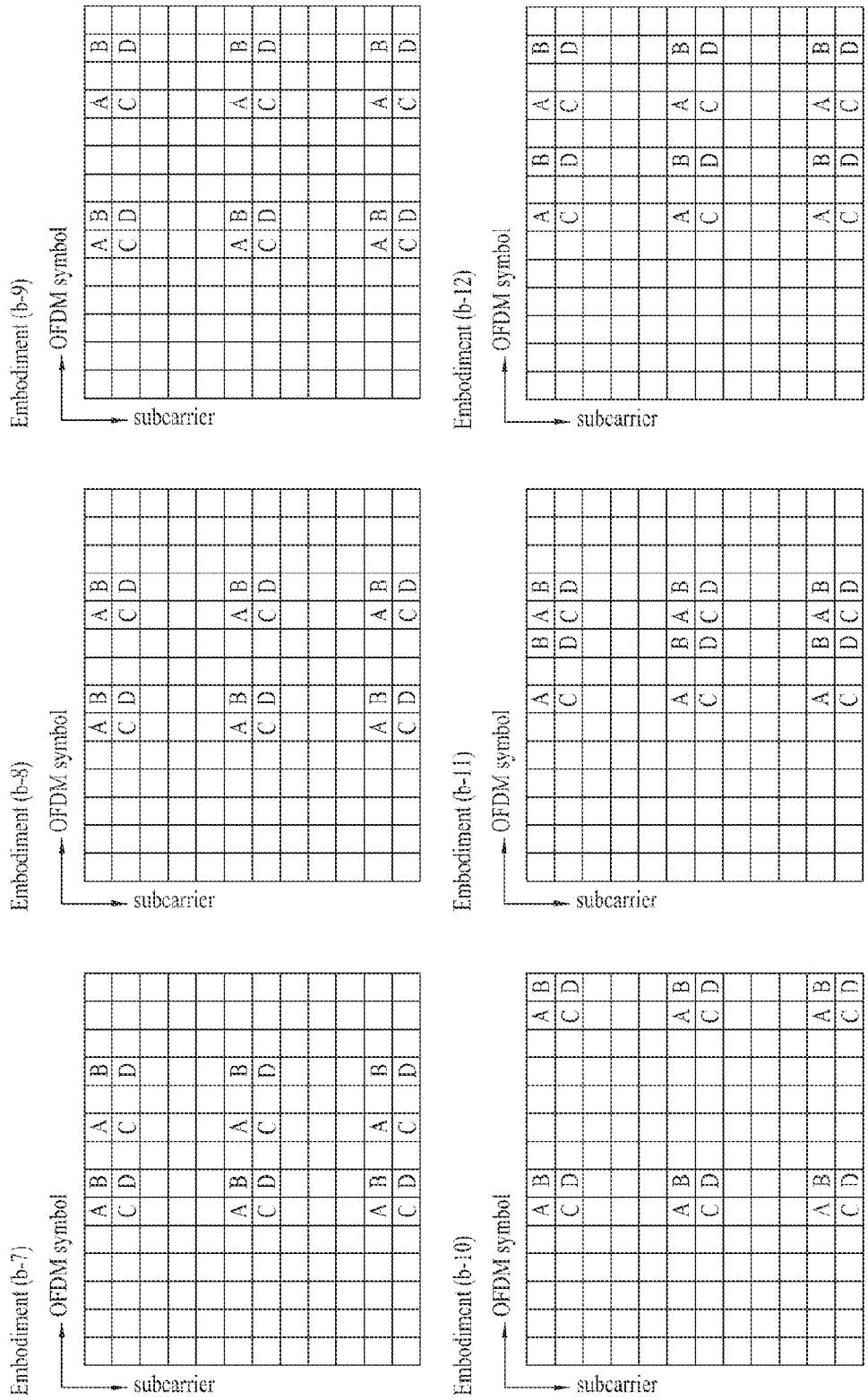
Figure 21:
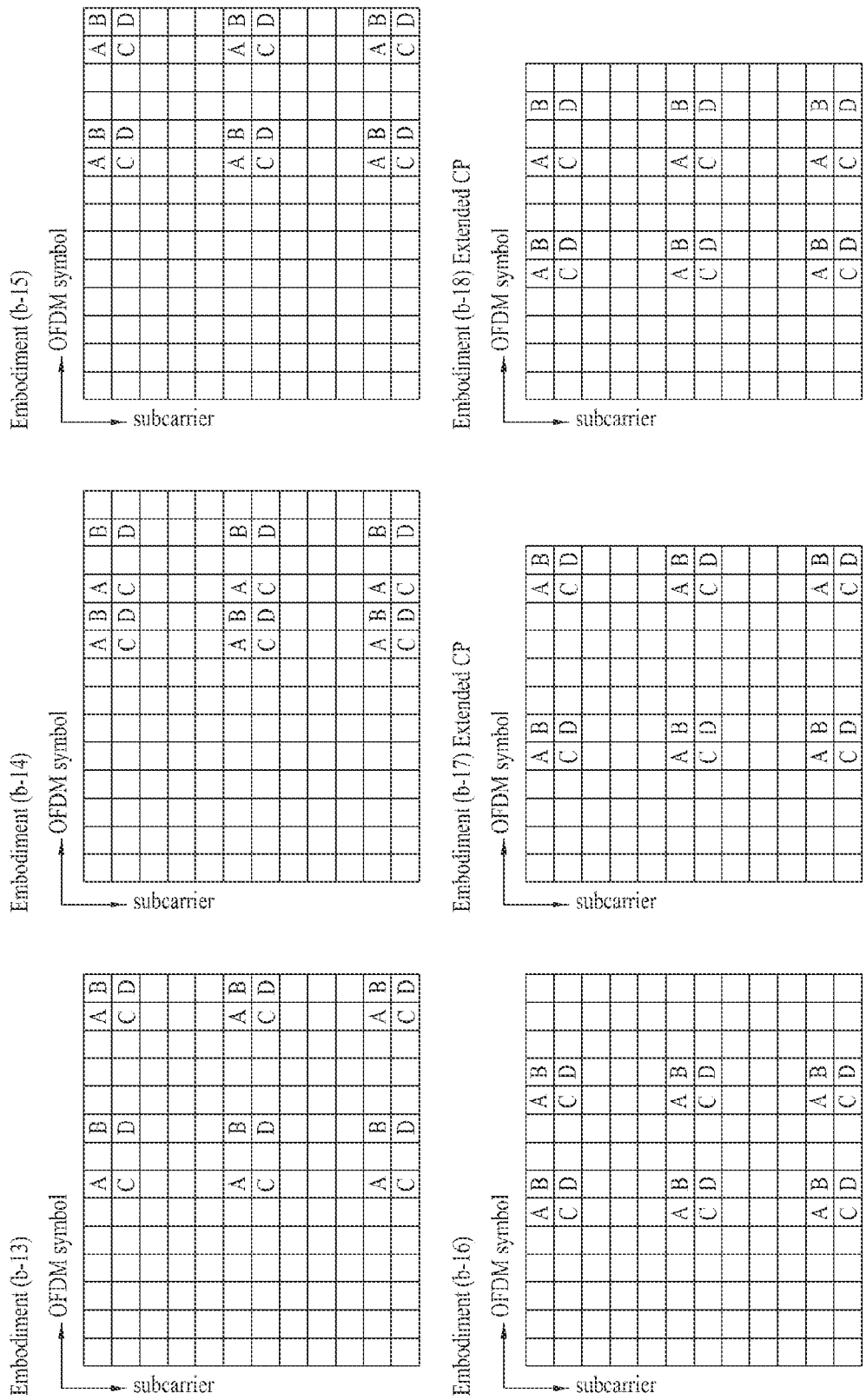
Figure 22:
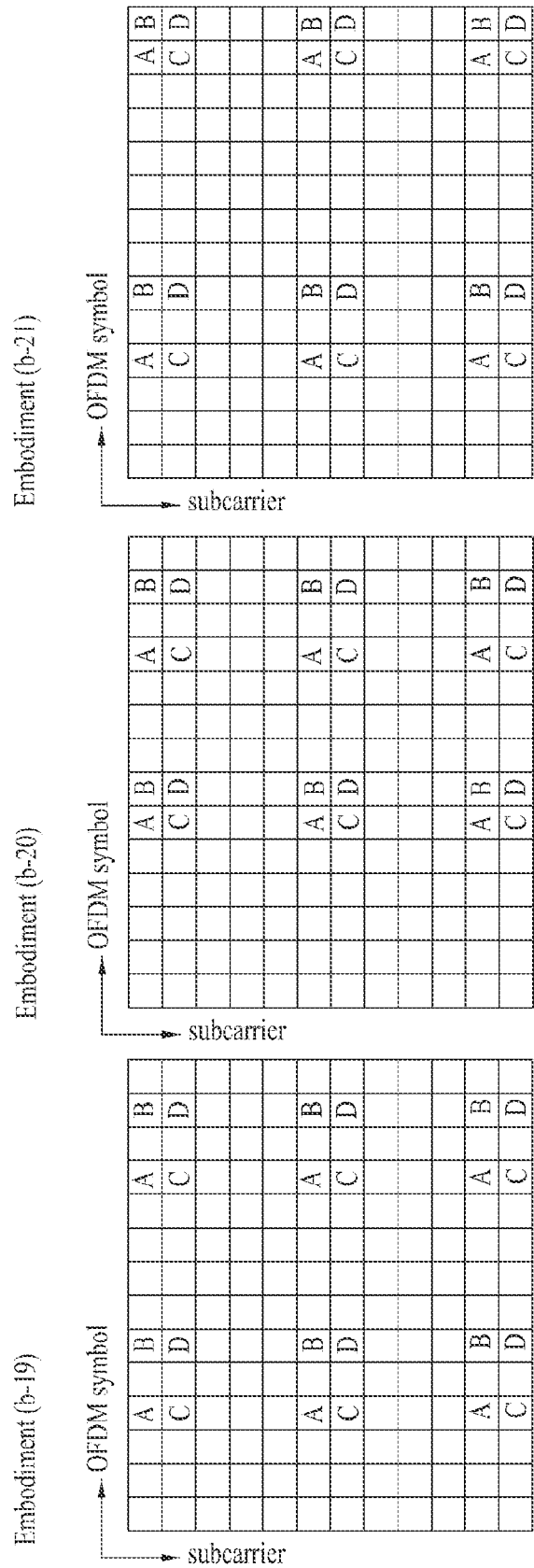
Figure 23:
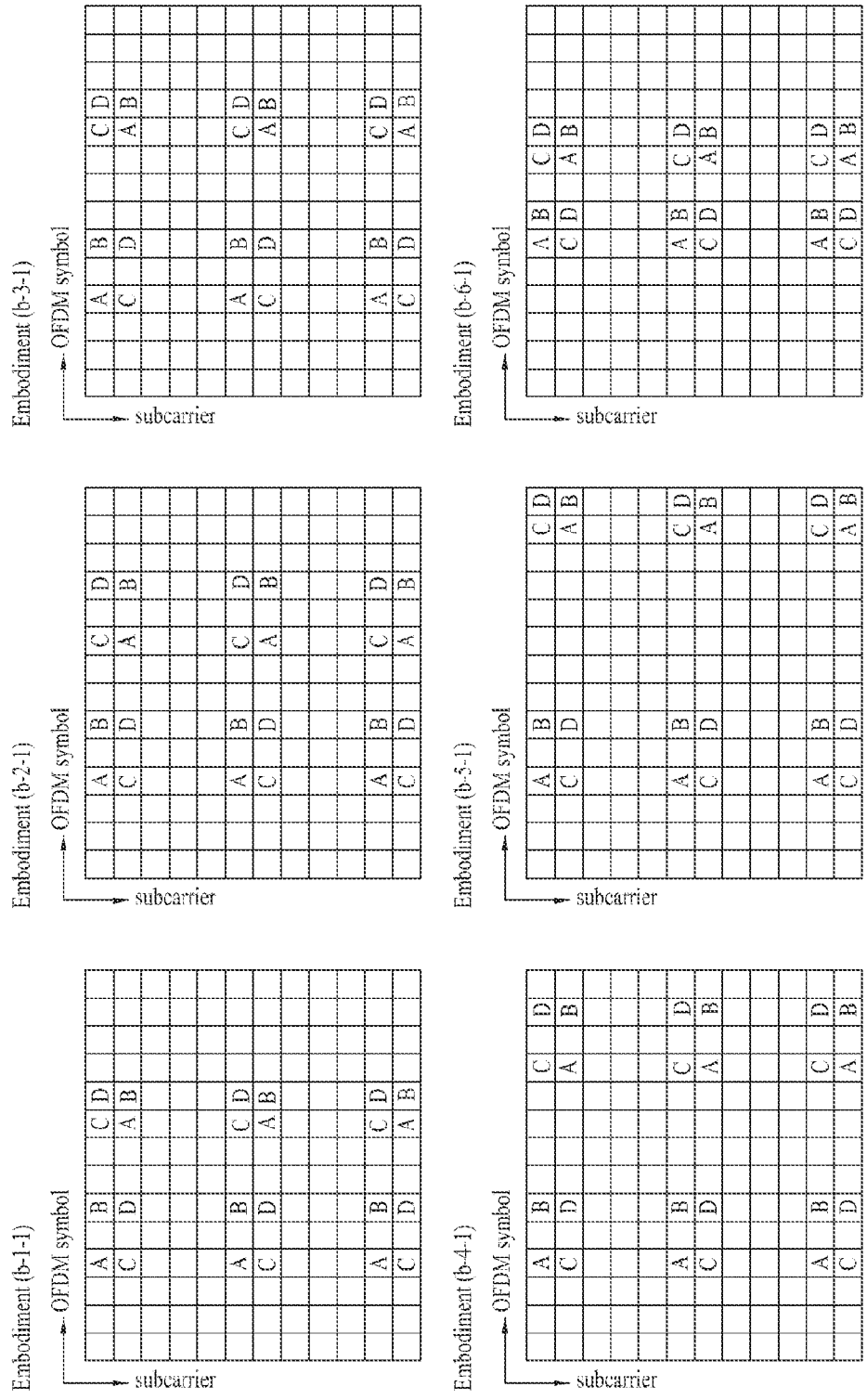
Figure 24:
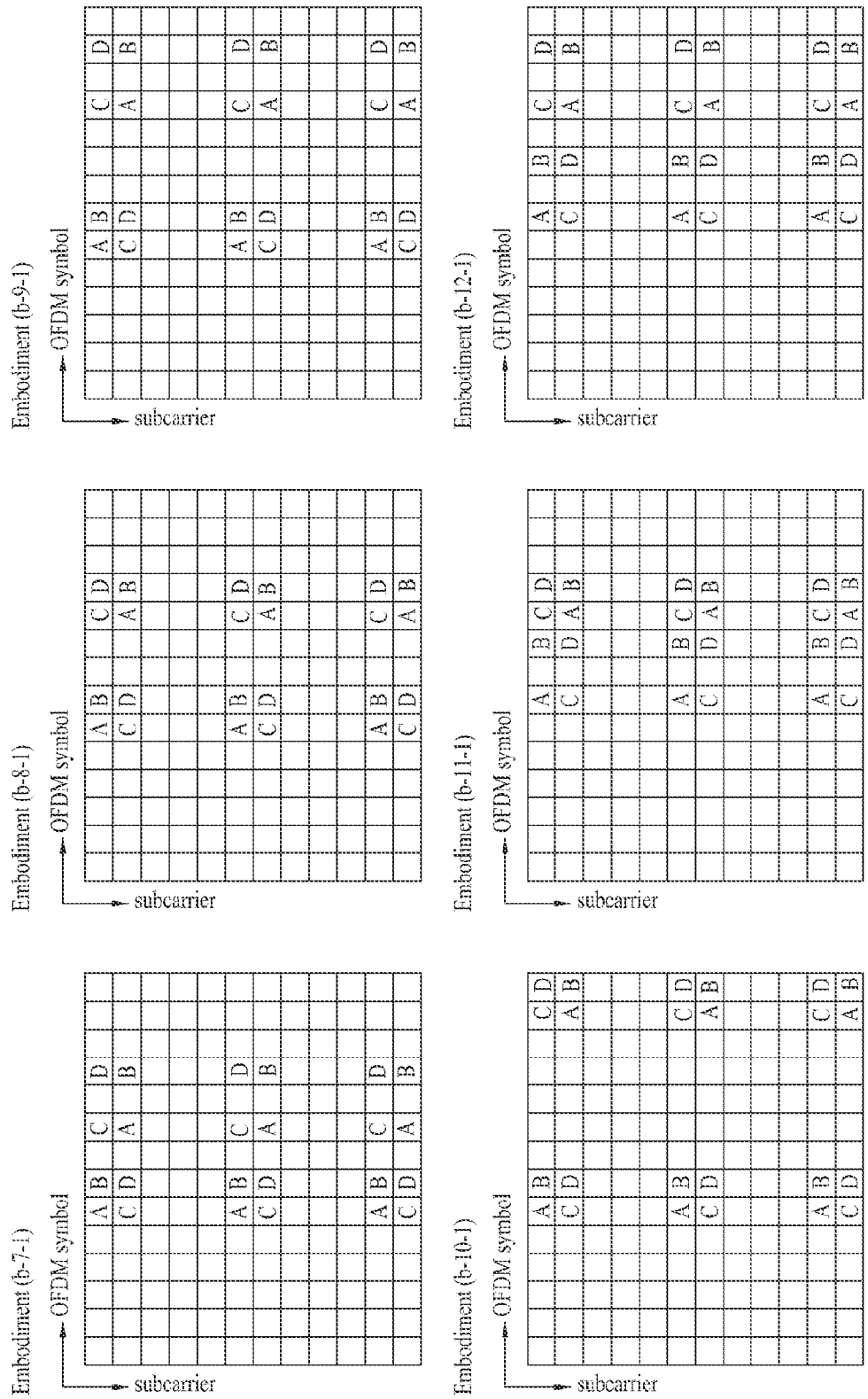

FIG. 16 to FIG. 18 show various modified examples of the DRS pattern shown in FIG. 6(a).

Figure 25:
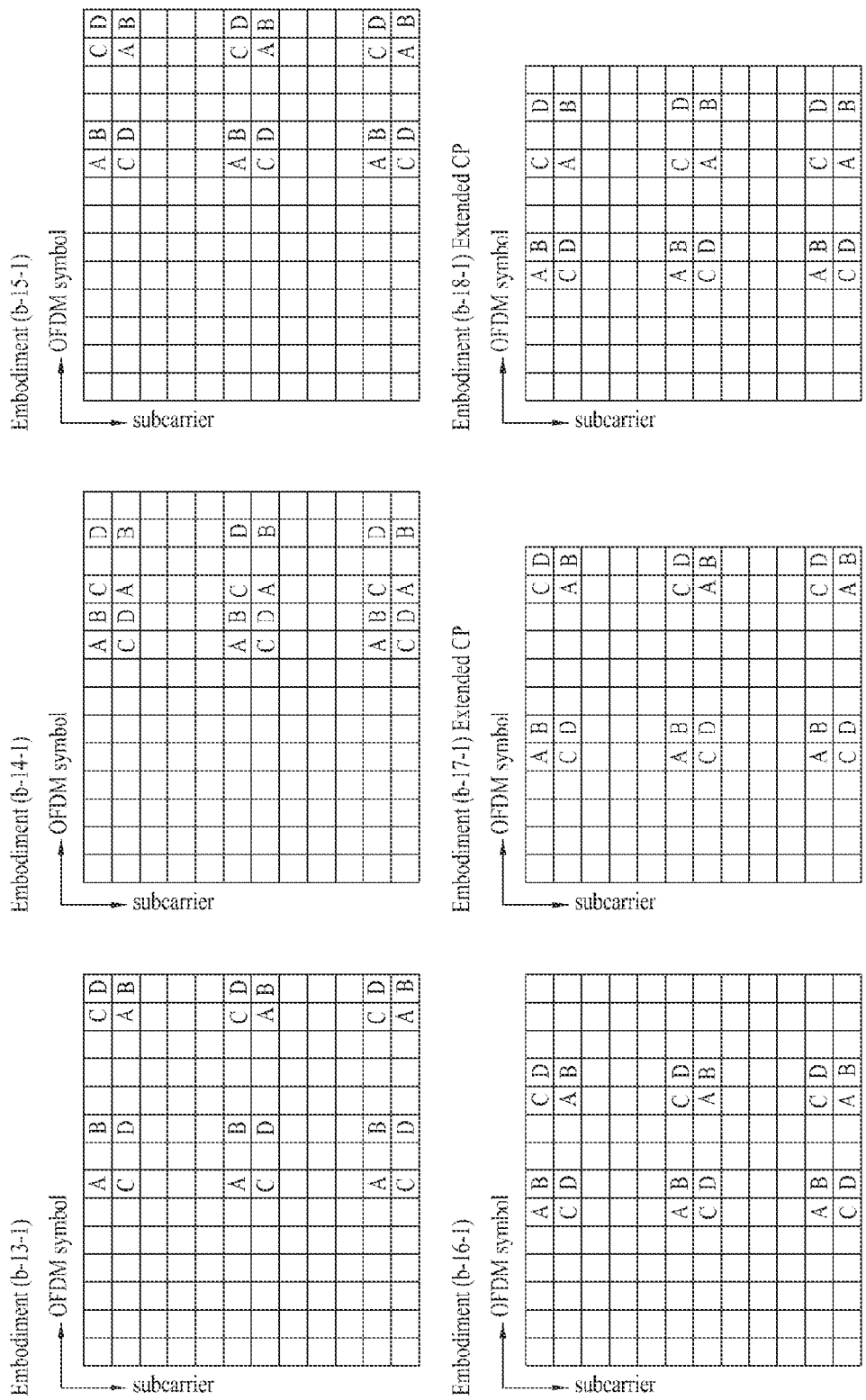
Figure 26:
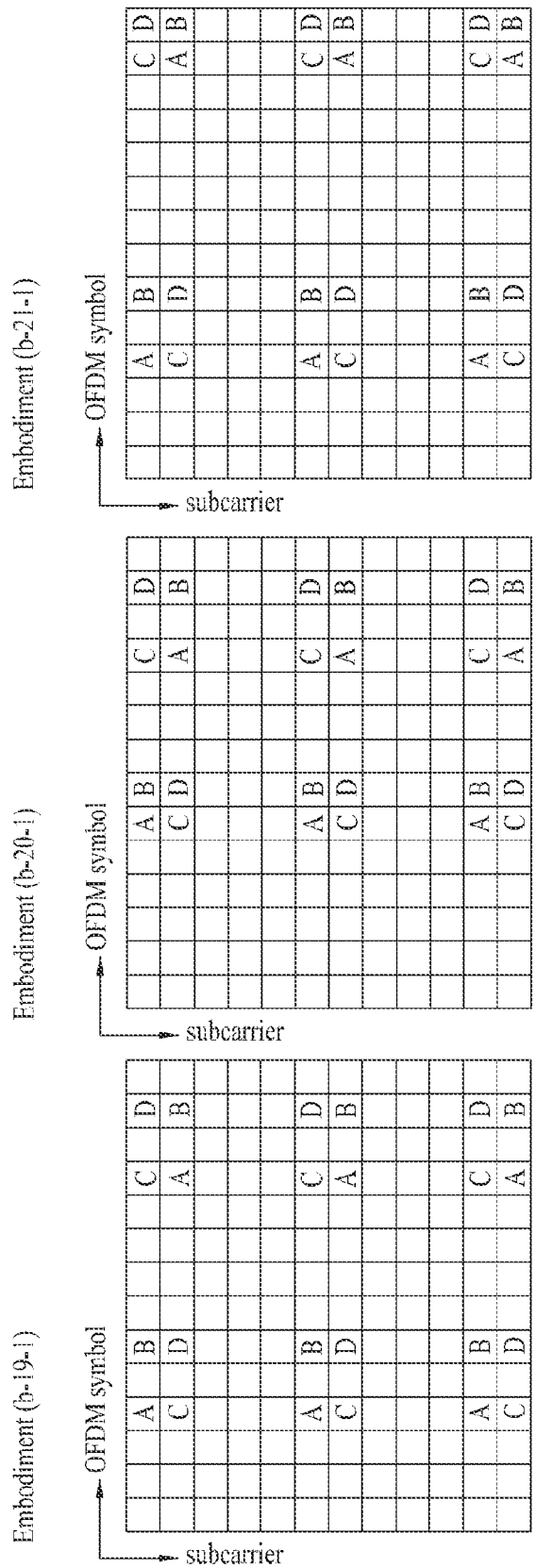
Figure 27:
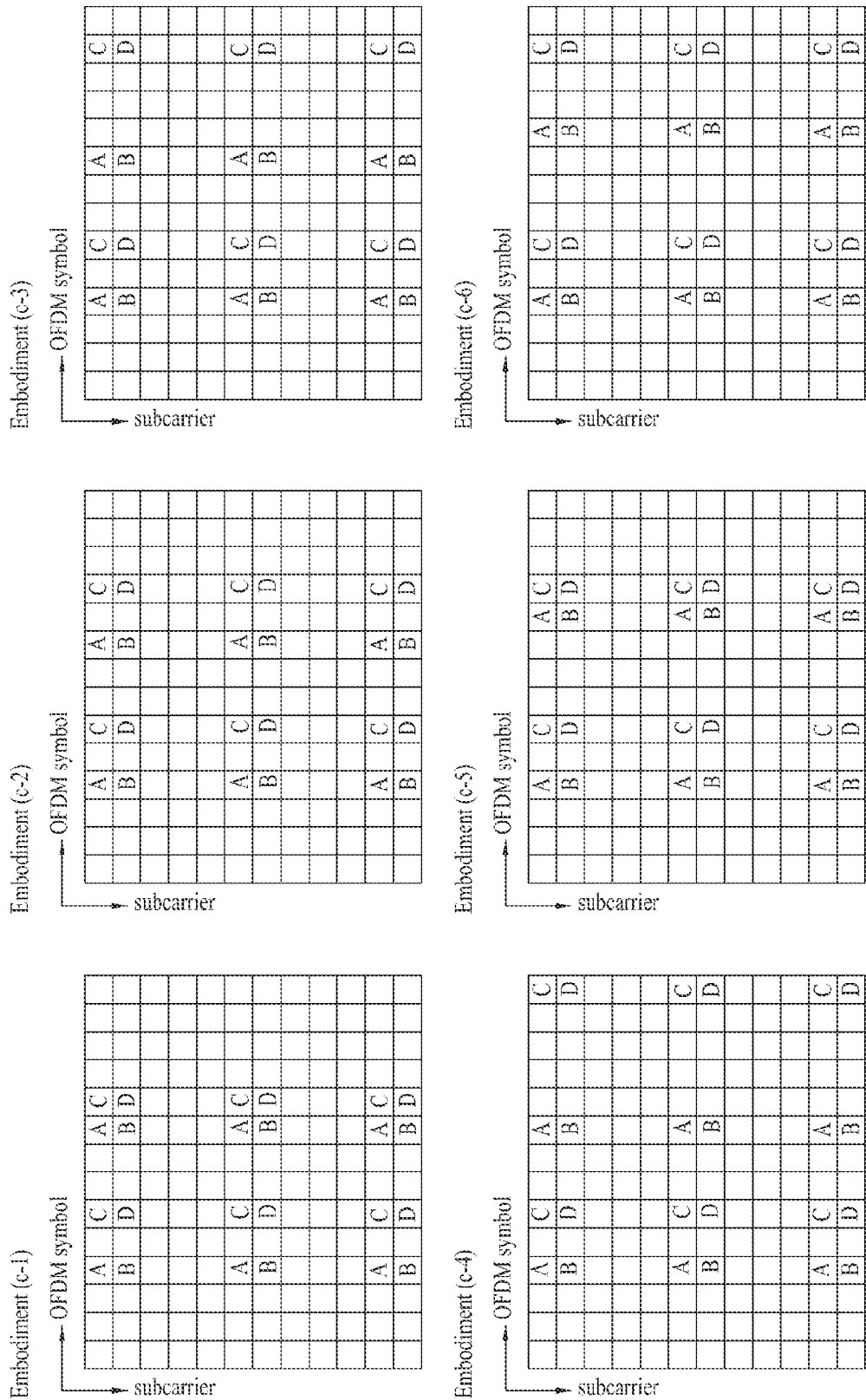
Figure 28:
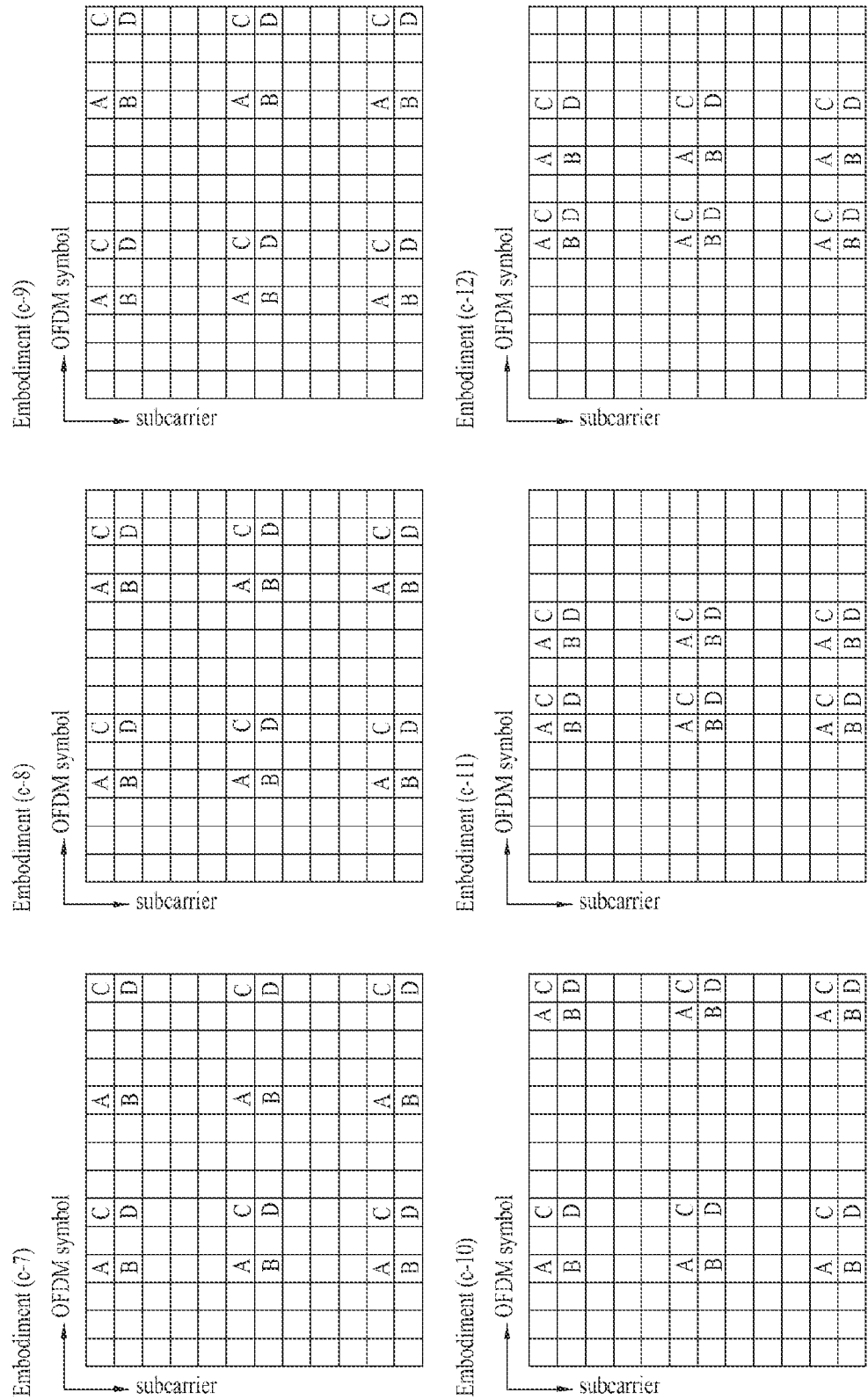
Figure 29:
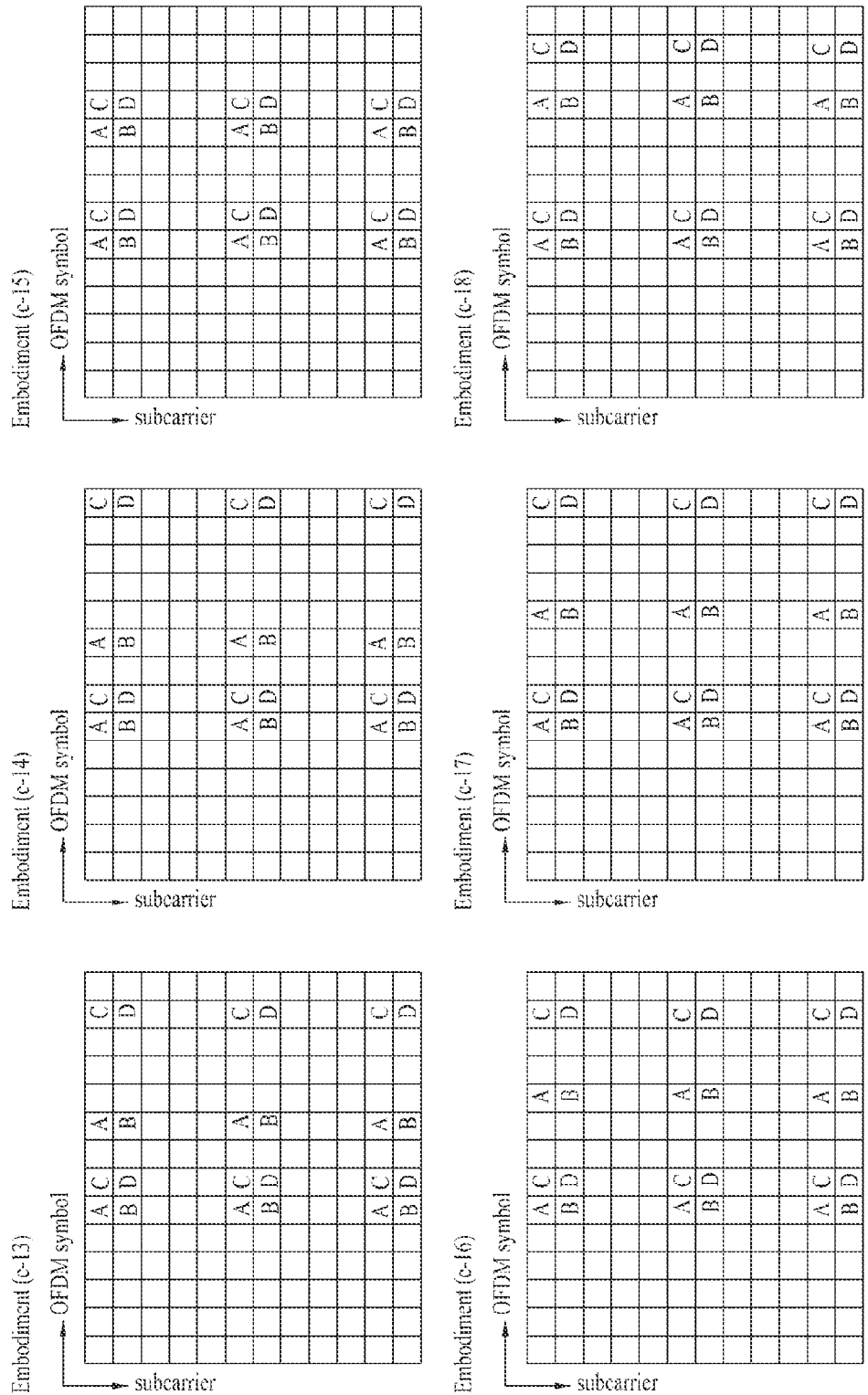
Figure 30:
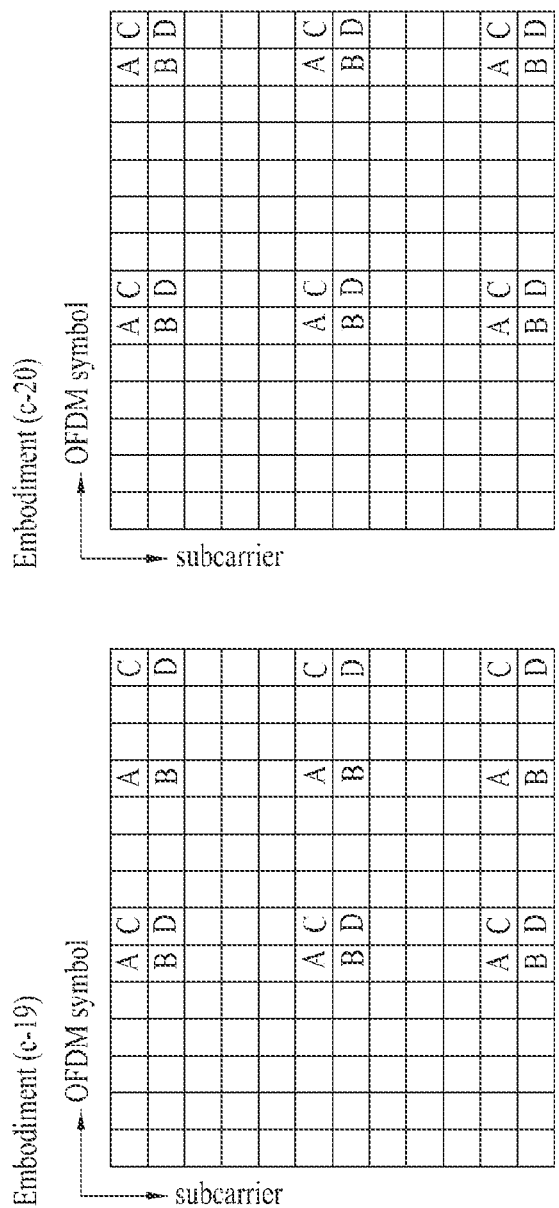

FIG. 19 to FIG. 22 show various modified examples of the DRS pattern shown in FIG. 6(b). FIG. 23 to FIG. 26 show modified examples of swapping DRS positions of a second slot between DRS groups in DRS patterns of FIG. 19 to FIG. 22. In more detail, A and B positions and C and D positions of the second slot are swapped in the frequency domain, thereby improving channel estimation performance. Meanwhile, embodiments b-17 and b-18 of FIG. 21 and embodiments b-17-1 and b-18-1 of FIG. 25 show DRS patterns in an extended CP case.

FIG. 27 to FIG. 30 shows various modified examples of the DRS pattern shown in FIG. 6(c).

The characteristics of the present invention described with reference to FIG. 6 to FIG. 15 may be equally applied to the various DRS patterns of FIG. 16 to FIG. 30. Especially, the various embodiments of the present invention which distinguish and multiplex DRSs for multiple layers using time, frequency, and/or code resources may be easily applied to the various patterns of FIG. 16 to FIG. 30. Furthermore, the method for multiplexing DRSs for up to rank 8 as described above may also be applied to the various DRS patterns of FIG. 16 to FIG. 30 as well as to the DRS patterns of FIG. 6. Accordingly, the scope of the present invention includes applying the above-described multiplexing method to the above various DRS patterns.

Figure 31:
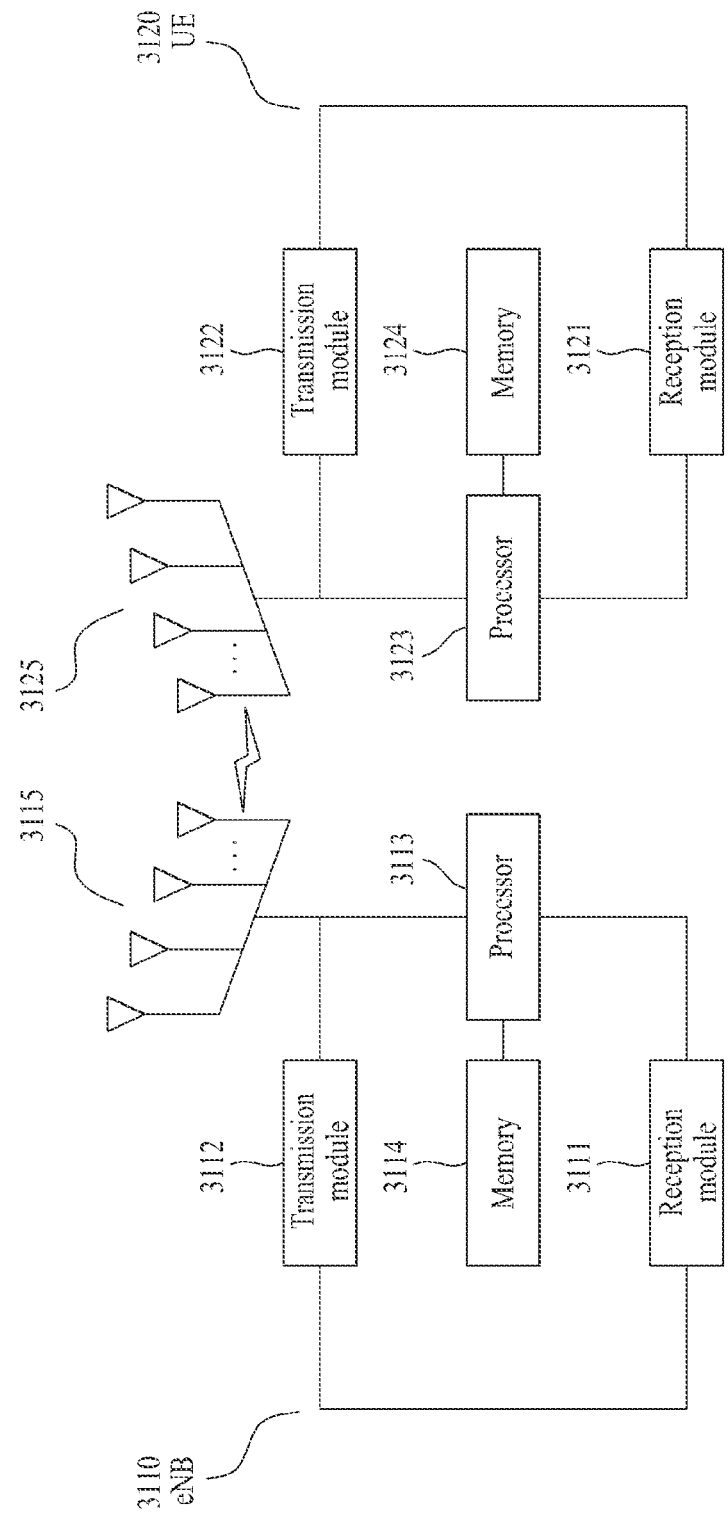
FIG. 31 is a diagram illustrating the configuration of an embodiment of a wireless communication system including an eNB device and a UE device according to the present invention.

FIG. 31 is a diagram illustrating the configuration of an embodiment of a wireless communication system including an eNB and a UE according to the present invention.

An eNB 3110 may include a reception module 3111, a transmission module 3112, a processor 3113, a memory 3114, and an antenna 3115. The reception module 3111 may receive various signals, data, information, etc. from a UE etc. The transmission module 3112 may transmit various signals, data, information, etc. to the UE etc. The processor 3113 may control overall operation of the eNB 3110 including the reception module 3111, the transmission module 3112, the memory 3114, and the antenna 3115. The antenna 3115 may include a plurality of antennas.

The processor 3113 multiplexes RSs for two or more layers based on an RS pattern in a data region of a downlink subframe to transmit the multiplexed RSs and transmits data for two or more layers in the data region of the downlink subframe. The RSs for two or more layers are dedicated RSs which are used by a receiving end to demodulate data for two or more layers. The processor 3113 may code division multiplex RSs for two or more layers by an orthogonal code of length two or more and may arrange the multiplexed RSs in the downlink data region based on the RS pattern.

The processor 3113 may also operationally process information received by a UE, information to be transmitted to the outside, and the like. The memory 3114 may store the operationally processed information for a predetermined time and may be replaced with an element such as a buffer (not shown).

Meanwhile, a UE 3120 may include a reception module 3121, a transmission module 3122, a processor 3123, and a memory 3124. The reception module 3121 may receive various signals, data, information, etc. from the eNB etc. The transmission module 3122 may transmit various signals, data, information, etc. to the eNB etc. The processor 3123 may control overall operation of the UE 3120 including the reception module 3121, the transmission module 3122, the memory 3124, and the antenna 3125. The antenna 3125 may include a plurality of antennas.

The processor 3123 multiplexes RSs for two or more layers based on an RS pattern in a data region of a downlink subframe to receive the multiplexed RSs and receives data for two or more layers on the data region of the downlink subframe. The RSs for two or more layers are dedicated RSs which are used by the UE 3120 to demodulate data for two or more layers. Moreover, the RSs for two or more layers are code division multiplexed by an orthogonal code of length 2 or more and may be arranged in the downlink data region. The processor 3120 may perform demultiplexing corresponding to an RS multiplexing scheme to obtain the RSs for two or more layers.

The processor 3123 may also operationally process information received by the UE, information to be transmitted to the outside, and the like. The memory 3124 may store the operationally processed information for a predetermined time and may be replaced by an element such as a buffer (not shown).

When the eNB 3110 transmits an RS and the UE 3120 receives the RS, the following description is commonly applied. For multiplexing of RSs for two or more layers, CDM may include time domain covering or frequency domain covering. To multiplex RSs for n layers using a CDM scheme, n orthogonal codes may be used. The orthogonal codes may be generated from an orthogonal cover matrix such as a Walsh matrix or a DFT matrix. When generating the orthogonal codes, if the number of RS positions covered in the time or frequency domain is greater than the number of elements of one row or column of an orthogonal cover matrix, the orthogonal codes may be generated by cyclically repeating one row or column of the orthogonal cover matrix.

RSs may not only be code division multiplexed but also be time division multiplexed and/or frequency division multiplexed in a data region of a downlink subframe. TDM refers to multiplexing of RSs for two or more layers using OFDM symbol resources. If CDM and TDM are simultaneously applied, the RSs may be code division multiplexed using fewer orthogonal codes than the number of layers. FDM refers to multiplexing of RSs for two or more layers using subcarrier resources. If CDM and FDM are simultaneously applied, the RSs may be code division multiplexed using fewer orthogonal codes than the number of layers.

Meanwhile, an RS pattern for determining positions in which RSs for two or more layers are arranged in the data region of the downlink subframe may include a first RS group (DRS group #0) and a second RS group (DRS group #1). For instance, the first RS group (DRS group #0) may include a first RS position (A) and a second RS position (B), and the second RS group (DRS group #1) may include a third RS position (C) and a fourth RS position (D). The RSs may be arranged using one or more of the RS groups according to the number of layers (or rank). Detailed examples of the RS pattern are shown in FIG. 6 and FIG. 16 to FIG. 30.

The above-described embodiments of the present invention can be implemented by various means, for example, hardware, firmware, software, or combinations thereof.

In the case of a hardware configuration, the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be achieved by a module, a procedure, a function, etc. performing the above-described functions or operations. Software code may be stored in a memory unit and executed by a processor. The memory unit is located at the interior or exterior of the processor and may transmit data to and receive data from the processor via various known means.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

The present invention may be carried out in other specific ways than those set forth herein without departing from the spirit and essential characteristics of the present invention. The above detailed description is therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. The invention should not be limited to the specific embodiments described herein, but should be accorded the broadest scope consistent with the principles and novel features disclosed herein. Also, claims that are not explicitly cited in the appended claims may be presented in combination as an exemplary embodiment of the present invention or included as a new claim by subsequent amendment after the application is filed.

INDUSTRIAL APPLICABILITY

Although the above embodiments have been described focusing mainly on the 3GPP LTE series system, the present invention is not limited thereto and may be applied to various mobile communication systems to which MIMO technology is applied by the same scheme as the downlink RS transmission method.

The invention claimed is:

1. A method for transmitting a downlink signal using two or more antenna ports in a base station (BS), the method comprising:

multiplexing, by the BS, reference signals for the two or more antenna ports based on a reference signal pattern, the reference signals being dedicated to a user equipment (UE), the multiplexing including code division multiplexing the dedicated reference signals for the two or more antenna ports and frequency division multiplexing the dedicated reference signals for the two or more antenna ports across different subcarrier positions; and transmitting, by the BS to the UE via the two or more antenna ports, data and the multiplexed dedicated reference signals in a data region of a downlink subframe, wherein a first pair of the dedicated reference signals are used for a first pair of the two or more antenna ports and a second pair of the dedicated reference signals are used for a second pair of the two or more antenna ports, and wherein the first pair of the dedicated reference signals are distinguished from each other based on the code division multiplexing with orthogonal codes having values (1, 1, 1, 1) and (1, −1, 1, −1), respectively, wherein the second pair of the dedicated reference signals are distinguished from each other based on the code division multiplexing with the orthogonal codes having values (1, 1, 1, 1) and (1, −1, 1, −1), respectively, and wherein the first pair of the dedicated reference signals and the second pair of the dedicated reference signals are distinguished from each other based on the frequency division multiplexing.

2. The method of claim 1, wherein the code division multiplexing includes: a time domain covering in which a corresponding one of the orthogonal codes is multiplied across two or more orthogonal frequency division multiplexing (OFDM) symbols on which the dedicated reference signals are arranged, and wherein the frequency division multiplexing includes a frequency domain covering in which a corresponding one of the orthogonal codes is multiplied across two or more subcarriers on which the dedicated reference signals are arranged.

3. The method of claim 2, wherein the orthogonal code is generated:

from a Walsh matrix or a discrete Fourier transform matrix, or by cyclically repeating one row or column of the Walsh matrix or the discrete Fourier transform matrix.

4. The method of claim 1, wherein a number of the orthogonal codes used in the code division multiplexing corresponds to a number of the two or more antenna ports.

5. The method of claim 1, wherein a number of the orthogonal codes used in the code division multiplexing is less than a number of the two or more antenna ports.

6. The method of claim 1, wherein:

the reference signal pattern includes a first reference signal group and a second reference signal group, the first reference signal group includes a first reference signal position and a second reference signal position, and the second reference signal group includes a third reference signal position and a fourth reference signal position, and the dedicated reference signals are arranged in one or more reference signal positions of the first and second reference signal groups based on a number of the two or more antenna ports.

7. The method of claim 1, wherein the first pair of the dedicated reference signals are mapped to a same time-and-frequency resource element.

8. The method of claim 1, wherein the first pair of the dedicated reference signals are mapped to resource elements allocated in a same time domain and in an adjacent frequency domain in the data region of the downlink subframe.

9. The method of claim 1, wherein the first pair of the dedicated reference signals are mapped to resource elements where a sixth, seventh, thirteenth and fourteenth OFDM symbols and a first, sixth and eleventh subcarriers are located.

10. A method for receiving a downlink signal using two or more antenna ports in a user equipment (UE), the method comprising:

receiving, by the UE from a base station (BS), data and multiplexed reference signals for the two or more antenna ports in a data region of a downlink subframe, the multiplexed reference signals being dedicated to the UE and being multiplexed based on a reference signal pattern, the multiplexing including code division multiplexing the dedicated reference signals for the two or more antenna ports and frequency division multiplexing the dedicated reference signals across the two or more antenna ports by different subcarrier positions; and demultiplexing, by the UE, the multiplexed dedicated reference signals and processing the data based on the dedicated reference signals, wherein a first pair of the dedicated reference signals are used for a first pair of the two or more antenna ports and a second pair of the dedicated reference signals are used for a second pair of the two or more antenna ports, and wherein the first pair of the dedicated reference signals are distinguished from each other based on the code division multiplexing with orthogonal codes having values (1, 1, 1, 1) and (1, −1, 1, −1), respectively, wherein the second pair of the dedicated reference signals are distinguished from each other based on the code division multiplexing with the orthogonal codes having values (1, 1, 1, 1) and (1, −1, 1, −1), respectively, and wherein the first pair of the dedicated reference signals and the second pair of the dedicated reference signals are distinguished from each other based on the frequency division multiplexing.

11. The method of claim 10, wherein the code division multiplexed dedicated reference signals are formed by multiplexing that includes a time domain covering in which a corresponding one of the orthogonal codes is multiplied across two or more orthogonal frequency division multiplexing (OFDM) symbols on which the dedicated reference signals are arranged, and wherein the frequency division multiplexing includes a frequency domain covering in which a corresponding one of the orthogonal codes is multiplied across two or more subcarriers on which the dedicated reference signals are arranged.

12. The method of claim 11, wherein the orthogonal code is generated:

from a Walsh matrix or a discrete Fourier transform matrix, or by cyclically repeating one row or column of the Walsh matrix or the discrete Fourier transform matrix.

13. The method of claim 11, wherein:

the reference signal pattern includes a first reference signal group and a second reference signal group, the first reference signal group includes a first reference signal position and a second reference signal position, and the second reference signal group includes a third reference signal position and a fourth reference signal position, and the dedicated reference signals are arranged in one or more reference signal positions of the first and second reference signal groups based on a number of the two or more antenna ports.

14. The method of claim 10, wherein a number of the orthogonal codes used in the code division multiplexing corresponds to a number of the two or more antenna ports.

15. The method of claim 10, wherein a number of the orthogonal codes used in the code division multiplexing is less than a number of the two or more antenna ports.

16. A base station configured to transmit a downlink signal using two or more antenna ports, the base station comprising:
- a plurality of antennas;
- a receiver;
- a transmitter; and
- a processor operatively connected to the plurality of antennas, the receiver, and the transmitter, wherein the processor is configured to:
- multiplex reference signals for the two or more antenna ports based on a reference signal pattern, the reference signals being dedicated to a user equipment (UE), the multiplexing including code division multiplexing the dedicated reference signals for the two or more antenna ports and frequency division multiplexing for the two or more antenna ports across different subcarrier positions, and
- transmit data and the multiplexed dedicated reference signals in a data region of a downlink subframe via the two or more antenna ports, wherein a first pair of the dedicated reference signals are used for a first pair of the two or more antenna ports and a second pair of the dedicated reference signals are used for a second pair of the two or more antenna ports, and wherein the first pair of the dedicated reference signals are distinguished from each other based on the code division multiplexing with orthogonal codes having values (1, 1, 1, 1) and (1, −1, 1, −1), respectively, wherein the second pair of the dedicated reference signals are distinguished from each other based on the code division multiplexing with the orthogonal codes having values (1, 1, 1, 1) and (1, −1, 1, −1), respectively, and wherein the first pair of the dedicated reference signals and the second pair of the dedicated reference signals are distinguished from each other based on the frequency division multiplexing.

17. A user equipment configured to receive a downlink signal using two or more antenna ports, the user equipment comprising:
- a plurality of antennas;
- a receiver;
- a transmitter; and
- a processor operatively connected to the plurality of antennas, the receiver, and the transmitter, wherein the processor is configured to:
- receive data and multiplexed reference signals for the two or more antenna ports in a data region of a downlink subframe, the multiplexed reference signals being dedicated to the UE and being multiplexed based on a reference signal pattern, the multiplexing including code division multiplexing the dedicated reference signals for the two or more antenna ports and frequency division multiplexing the dedicated reference for the two or more antenna ports across different subcarrier positions, and
- demultiplex the multiplexed dedicated reference signals and process the data based on the reference signals, wherein a first pair of the dedicated reference signals are used for a first pair of the two or more antenna ports and a second pair of the dedicated reference signals are used for a second pair of the two or more antenna ports, and wherein the first pair of the dedicated reference signals are distinguished from each other based on the code division multiplexing with orthogonal codes having values (1, 1, 1, 1) and (1, −1, 1, −1), respectively, wherein the second pair of the dedicated reference signals are distinguished from each other based on the code division multiplexing with the orthogonal codes having values (1, 1, 1, 1) and (1, −1, 1, −1), respectively, and wherein the first pair of the dedicated reference signals and the second pair of the dedicated reference signals are distinguished from each other based on the frequency division multiplexing.

\* \* \* \* \*